United States Patent Office 3,751,417
Patented Aug. 7, 1973

3,751,417
1-ACYL-3-(2-(4-PHENYL-1-PIPERAZINYL)ETHYL) INDOLINES
George Rodger Allen, Jr., Old Tappan, N.J., Francis Joseph McEvoy, Pearl River, N.Y., Vern Gordon De Vries, Ridgewood, N.J., Daniel Bryan Moran, Suffern, N.Y., and Ruddy Littell, River Vale, N.J., assignors to American Cyanamid Company, Stamford, Conn.
No Drawing. Filed Aug. 12, 1971, Ser. No. 171,319
Int. Cl. C07d 51/70
U.S. Cl. 260—268 TR     10 Claims

ABSTRACT OF THE DISCLOSURE

This disclosure describes compounds of the class of substituted 1-acyl-3-[2-(4-phenyl - 1 - piperazinyl)ethyl]indolines useful as intermediates for the preparation of tranquilizing agents.

BRIEF SUMMARY OF THE INVENTION

This invention relates to new organic compounds and, more particularly, is concerned with novel substituted 1-acyl-3-[2-(4-phenyl - 1 - piperazinyl)ethyl]indolines and with novel methods for the preparation of these compounds. The novel substituted 1-acyl-3-[2-(4-phenyl-1-piperazinyl)ethyl]indolines of the present invention may be represented by the following general formula:

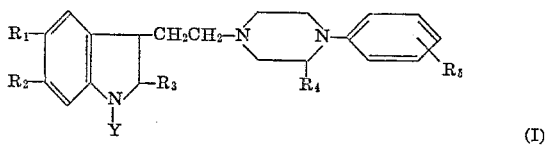

(I)

wherein $R_1$ is hydrogen, chloro, bromo, lower alkoxy, nitro, amino, acetamido or dimethylamino; $R_2$ is hydrogen, lower alkoxy or nitro and $R_1$ and $R_2$ taken together is methylenedioxy; $R_3$ is hydrogen or methyl; $R_4$ is hydrogen or methyl; $R_5$ is hydrogen, chloro, methoxy, methyl or trifluoromethyl; and Y is benzoyl, p-chlorobenzoyl, p-nitrobenzoyl or lower alkanoyl. Certain of the novel compounds of the present invention also possess analgesic activity. These may be represented by the following general formula:

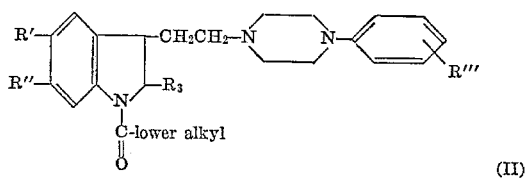

(II)

wherein R' is hydrogen or lower alkoxy, R" is hydrogen or lower alkoxy and R' and R" taken together is methylenedioxy, R'" is hydrogen or lower alkoxy, and $R_3$ is as hereinabove defined. Suitable lower alkoxy groups contemplated by the present invention are those having up to four carbon atoms such as, for example, methoxy, ethoxy, isopropoxy, sec-butoxy, etc. Suitable lower alkanoyl groups contemplated by the present invention are acetyl, propionyl, n-butyryl and isobutyryl; whereas suitable lower alkyl groups are methyl, ethyl, n-propyl and isopropyl. Typical compounds of the present invention represented by General Formula I, above, are, for example, 1-benzoyl-6-methoxy-3-[2-(4-phenyl-1-piperazinyl) ethyl]indoline,
1-(p-chlorobenzoyl)-6-methoxy-3-{2-[4-(o-tolyl)-1-piperazinyl]ethyl}indoline,
1-(p-nitrobenzoyl)-5-amino-6-methoxy-3-[2-(4-phenyl-1-piperazinyl)ethyl]indoline,
1-acetyl-5-bromo-3-{2-[4-(p-tolyl)-1-piperazinyl] ethyl}indoline,
1-propionyl-5-chloro-2-methyl-3-[2-(4-phenyl-1-piperazinyl)ethyl]indoline,
1-(n-butyryl)-5,6-dimethoxy-3-{2-[4-m-trifluoromethylphenyl)-1-piperazinyl]ethyl}indoline,
5-isobutyryl-6,7-dihydro-7-{2-[4-(m-trifluoromethylphenyl)-1-piperazinyl]ethyl}-5H-1,3-dioxolo-[4,5-f]indoline,
1-benzoyl-5,6-dimethoxy-3-{2-[4-(m-methoxyphenyl)-1-piperazinyl]ethyl}-2-methylindoline,
5-(p-chlorobenzoyl)-6,7-dihydro-7-{2-[4-(p-methoxyphenyl)-1-piperazinyl]ethyl}-5H-1,3-dioxolo-[4,5-f]indole,
1-(p-nitrobenzoyl)-5-bromo-3-{2-[4-(p-chlorophenyl)-1-piperazinyl]ethyl}indoline,
1-acetyl-5,6-dimethoxy-3-{2-[4-(m-chlorophenyl)-3-methyl-1-piperazinyl]ethyl}indoline,
5-propionyl-6,7-dihydro-7-{2-[4-(p-chlorophenyl)-3-methyl-1-piperazinyl]ethyl}-5H-1,3-dioxolo-[4,5-f]indole,
1-(n-butyryl)-5-amino-3-[2-(4-phenyl-1-piperazinyl) ethyl]indoline,
1-isobutyryl-5-dimethylamino-3-{2-[4-(m-trifluoromethylphenyl)-1-piperazinyl)ethyl}indoline,
1-benzoyl-5-chloro-3-{2-[4-(o-methoxyphenyl)-1-piperazinyl)ethyl}indoline,
1-(p-chlorobenzoyl)-3-{2-[4-(o-tolyl)-1-piperazinyl] ethyl}indoline,
1-(p-nitrobenzoyl)-3-{2-[4-(p-tolyl)-2-methyl-1-piperazinyl]ethyl}indoline,
1-acetyl-3-{2-[4-(m-tolyl)-1-piperazinyl]ethyl}indoline,
1-propionyl-5,6-dimethoxy-3-{2-[4-(o-tolyl)-1-piperazinyl]ethyl}-2-methylindoline,
1-(n-butyryl)-5,6-dimethoxy-3-{2-[4-(m-tolyl)-1-piperazinyl]ethyl}-2-methylindoline,
5-isobutyryl-6,7-dihydro-7-{2-[4-(m-methoxyphenyl)-1-piperazinyl]ethyl}-5H-1,3-dioxolo[4,5-f]indole,
1-benzoyl-5-methoxy-2-methyl-3-[2-(4-phenyl-1-piperazinyl]ethyl-6-nitroindoline,
1-(p-chlorobenzoyl)-5-methoxy-2-methyl-3-{2-[4-(o-tolyl)-1-piperazinyl]ethyl}indoline,
1-(p-nitrobenzoyl)-5-methoxy-2-methyl-3-{2-[4-(m-tolyl)-1-piperazinyl]ethyl}-6-nitroindoline, and
1-acetyl-5-amino-3-{2-[4-(m-methoxyphenyl)-1-piperazinyl]ethyl}indoline.

DETAILED DESCRIPTION OF THE INVENTION

The substituted 1 - acyl-3-[2-(4-phenyl-1-piperazinyl) ethyl]indolines of the present invention are obtainable as crystalline materials having characteristic melting points and absorption spectra. They are appreciably soluble in many organic solvents such as lower alkanols, acetone, ethyl acetate, and the like but are generally insoluble in water. These compounds are organic bases and thus are capable of forming acid-addition and quaternary ammonium salts with a variety of organic and inorganic salt-forming reagents. Thus, acid-addition salts, formed by admixture of the organic free base with up to two equivalents of an acid, suitably in a neutral solvent, are formed with such acids as sulfuric, phosphoric, hydrochloric, hydrobromic, sulfamic, citric, maleic, fumaric, tartaric, acetic, benzoic, gluconic, ascorbic, and related acids. In like manner, quaternary ammonium salts may be formed by reaction of the free bases with a variety of organic esters of sulfuric, hydrohalic and aromatic sulfonic acids. The organic reagents employed for quaternary ammonium salt formation are preferably lower alkyl halides. However, other organic reagents are suitable for quaternary ammonium salt formation and may be selected from among a diverse class of compounds including benzyl chloride, phenethyl chloride, naphthylmethyl bromide, dimethyl sulfate, methyl benzenesulfonate, ethyl toluenesulfonate, allyl chloride, methallyl bromide and crotyl bromide. The acid-addition and quaternary ammonium salts of the substituted 1 - acyl-3-[2-(4-phenyl-1-piperazinyl) ethyl]indolines are, in general, crystalline solids relatively soluble in water, methanol and ethanol but relatively insoluble in non-polar organic solvents such as diethyl ether, benzene, toluene, and the like. For purposes of this invention, the free bases are equivalent to their non-toxic acid-addition and quaternary ammonium salts.

Certain of the substituted 1 - acyl-3-[2-(4-phenyl-1-piperazinyl)ethyl]indolines of the present invention may be prepared by the series of reactions set forth in the following reaction scheme:

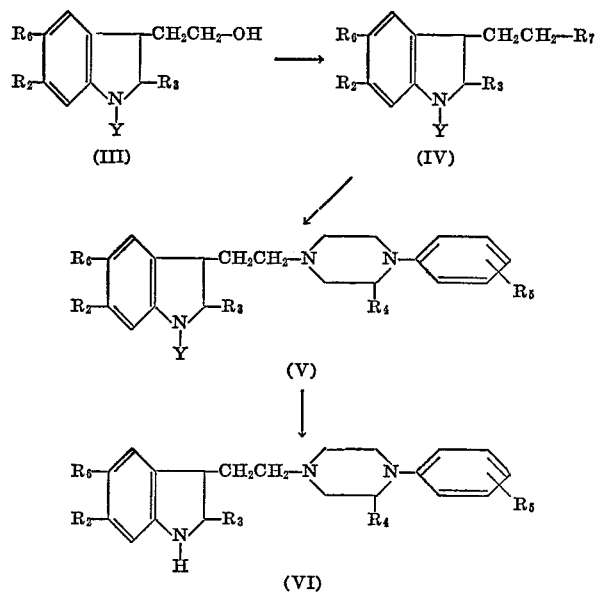

wherein $R_2$, $R_3$, $R_4$, $R_5$ and Y are as hereinabove defined; $R_6$ is hydrogen, chloro, bromo, lower alkoxy, nitro, acetamido or methylenedioxy when taken together with $R_2$; and $R_7$ is chloro, bromo, methanesulfonyloxy or p-toluenesulfonyloxy. In accordance with this reaction scheme, treatment of a 1-acyl-3-indoline ethanol (III) with phosphorus trichloride or phosphorus tribromide is productive of a 1-acyl-3-indoline ethyl chloride or bromide (IV, $R_7$=Cl or Br), respectively. Alternatively, treatment of the 1-acyl-3-indoline ethanol (III) with methanesulfonyl chloride or p-toluenesulfonyl chloride in a solvent such as pyridine or collidine gives the sulfonyl ester (IV, $R_7$=CH$_3$SO$_3$ or p-CH$_3$C$_6$H$_4$SO$_3$). Reaction of the intermediates (IV) with a 4-phenylpiperazine of the formula,

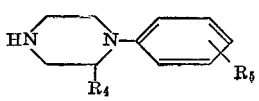

wherein $R_4$ and $R_5$ are as hereinabove defined, gives the 1-acyl - 3 - aminoethyleneindolines (V). This reaction is preferably conducted in an inert medium such as benzene, toluene, xylene, dioxane, and the like at temperatures of 50°–140° C. However, temperatures of 100°–110° C. are preferable. Hydrolysis of the 1-acyl-3-aminoethylenedindolines (V) provides the substituted 3-[2-(4-phenyl-1-piperazinyl)ethyl]indolines (VI) which possess tranquilizing activity. This conversion may be effected by acidic or basic hydrolysis. Mineral acid hydrolysis is particularly useful for this conversion. The preferred conditions consist of treating (V) with boiling 6 N hydrochloric acid solution for one-fifth to one-half hour.

Other compounds of the present invention may be prepared as indicated in the following reaction sequence:

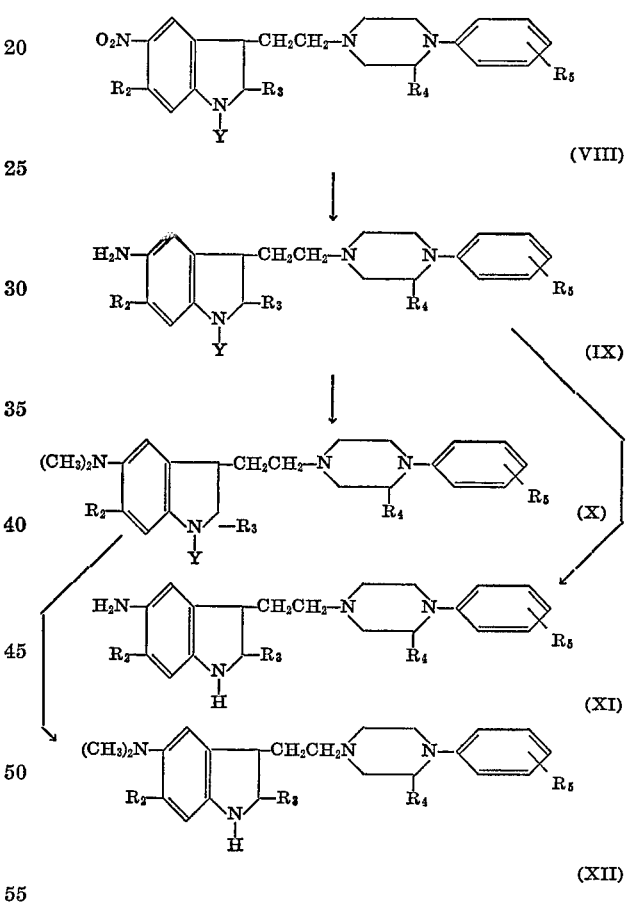

wherein $R_2$, $R_3$, $R_4$, $R_5$ and Y are as hereinabove defined. Thus, in accordance with this reaction scheme, reduction of a 1-acyl-5-nitroindoline ethylamine (VIII) affords the 1-acyl-5-aminoindoline ethylamine (IX). This reduction may be performed using a metal in mineral acid or catalytically. The latter process is particularly advantageous. Methylation of (IX) with formaldehyde and formic acid, according to the Eschweiler-Clarke procedure, gives the 1-acyl-5-dimethylamino derivatives (X). Mineral acid hydrolysis of the 1-acyl derivatives (IX) and (X) then gives the 5-aminoindoline ethylamine (XI) and the 5-dimethylamino derivatives (XII), respectively, which possess tranquilizing activity.

The novel 1-acyl-3-indoline ethanols (III) which may serve as starting materials for the substituted 1-acyl-3-aminoethyleneindolines (V) may be prepared by several procedures. In those instances when $R_3$ is hydrogen in (III), the appropriate 1-acyl-3-indoline ethanol may be prepared as set forth in the following reaction scheme:

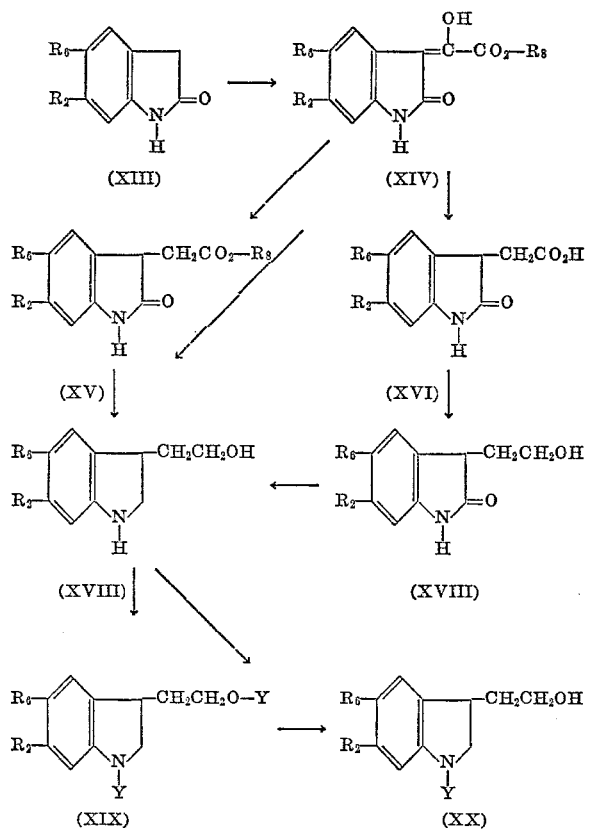

wherein $R_2$, $R_6$ and Y are as hereinabove defined and $R_8$ is lower alkyl of from 1 to 4 carbon atoms or phenyl lower alkyl such as benzyl, α-phenethyl and β-phenethyl. In accordance with this reaction scheme, condensation of an oxindole (XIII) with an oxalate ester (such as dimethyl oxalate, diisopropyl oxalate, dibenzyl oxalate, etc.) affords the corresponding isatylidene ester (XIV). The last substance may be converted into the 1-acyl-3-indoline ethanols (XX) by several routes. Clemmensen reduction of the isatylidene ester (XIV) gives the oxindoleacetic ester (XV). Diborane reduction of (XV) then gives the indoline ethanol (XVII). Alternatively, the isatylidene ester (XIV) may be converted directly into the indoline ethanol (XVII) by reduction with excess diborane. When the esterifying group ($R_8$) is benzyl, catalytic hydrogenation of the isatylidene ester (XIV) using a palladium-on-carbon catalyst affords the oxindoleacetic acid (XVI). This last substance may be converted into the indoline ethanols (XVII). Thus, treatment of (XVI) with a lower alkyl chloroformate produces a mixed carbonic anhydride. Reduction of this carbonic anhydride with sodium borohydride gives the oxindolylethanol (XVIII). Treatment of (XVIII) with diborane then affords the indoline ethanol (XVII). The conversion of (XVII) into the useful 1-acyl-3-indoline ethanols (XX) may be accomplished by either of two procedures. Thus, treatment of (XVII) with an acyl halide (YCl or YBr) or an acyl anhydride ($Y_2O$) under Schotten-Bauman conditions affords the 1-acyl-3-indoline ethanol (XX) directly. Alternatively, treatment of the indoline ethanol (XVII) with an acyl halide or an acyl anhydride in pyridine produces the O,N-diacyl derivative (XIX). The O-acyl group may be removed selectively to give the 1-acyl-3-indoline ethanol (XX). Sodium methoxide in methanol is particularly useful for this de-O-acylation. Solutions of ammonia or triethylamine in methanol may also be used for this selective deacylation.

Other 1-acylindoline ethanols may be prepared from the known 1-acetyl-3-indolineacetic acids (XXI) as set forth in the following reaction scheme:

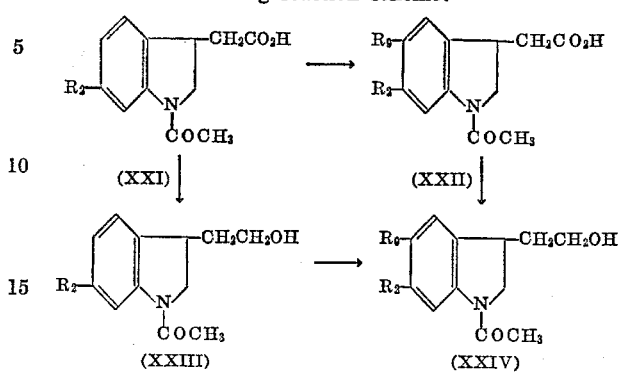

wherein $R_9$ is chloro, bromo or nitro and $R_2$ is as hereinabove defined. Thus, the 1-acetyl-3-indolineacetic acids (XXI) react with electrophilic agents to give the 5-substituted derivatives (XXII). Examples of such electrophilic agents are chlorine, bromine and nitric acid. These reagents react with (XXI) to give the 5-chloro, 5-bromo and 5-nitro derivatives (XXII), respectively. The reactions may be carried out in acetic acid at room temperature. The 1-acetyl-3-indolineacetic acids (XXI and XXII) may be reduced to give the 1-acetylindoline ethanols (XXIII and XXIV), respectively. Diborane is particularly effective for this transformation. Alternatively, the acids may be converted into mixed carbonic anhydrides by reaction with a lower alkyl chloroformate. Treatment of these mixed anhydrides with sodium borohydride then gives the 1-acetylindoline ethanols (XXIII and XXIV). The 1-acetyl-3-indoline ethanols (XXIII) can also serve as precursors for the alcohols (XXIV). Thus, treatment of (XXIII) with chlorine, bromine or nitric acid affords the 5-chloro, 5-bromo and 5-nitro derivatives (XXIV), respectively. The 1-acetyl-5-nitro - 3 - indoline ethanols (XXIV, $R_9=NO_2$) also serve as precursors for other 1-acetyl-3-indoline ethanols. Thus, hydrogenation in the presence of a noble metal catalyst affords the corresponding 6-substituted-1-acetyl - 5 - amino-3-indoline ethanols, acetylation of which gives the corresponding 5-acetamido derivatives.

Other important 1-acyl-3-indoline ethanols may be obtained in accordance with the following reaction scheme:

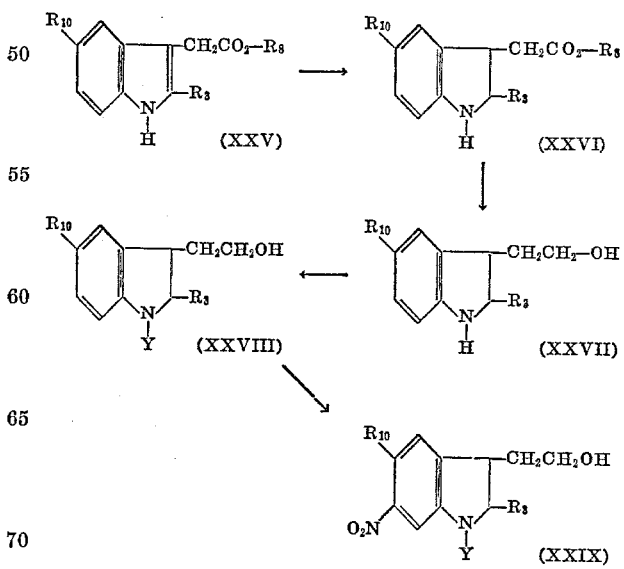

wherein $R_{10}$ is lower alkoxy and $R_3$, $R_8$ and Y are as hereinabove defined. Thus, reduction of a 3-indoleacetic ester (XXV) gives the corresponding 3-indolineacetic ester (XXVI). This reduction may be performed in several ways. The utilization of metallic tin and hydrochloric acid is particularly advantageous when the 3-indoleacetic ester (XXV) has a methyl group at the 2-position, since these conditions lead to a great degree of stereoselectivity. Other reductive procedures that have been used with a degree of success for the conversion of (XXV) to (XXVI) are catalytic hydrogenation in the presence of a noble metal catalyst under neutral or acidic conditions. Suitable catalysts are platinum, palladium, ruthenium, and the like. Appropriate solvents are those selected from the lower alkanols and mixtures of the lower alkanols with hydrochloric or fluoroboric acid. Treatment of the 3-indolineacetic ester (XXVI) with a metal hydride such as lithium aluminum hydride is productive of the indoline ethanol (XXVII). The resulting indoline ethanol (XXVII) may be acylated with an acyl chloride (YCl) or anhydride (Y₂O) to give the 1-acyl derivative (XXVIII). Treatment of the 1-acyl derivative (XXVIII) with nitric acid in acetic acid gives the 1-acyl -6-nitro-3-indoline ethanol (XXIX).

Other important 1-acyl-3-indoline ethanols may be obtained in accordance with the following reaction scheme:

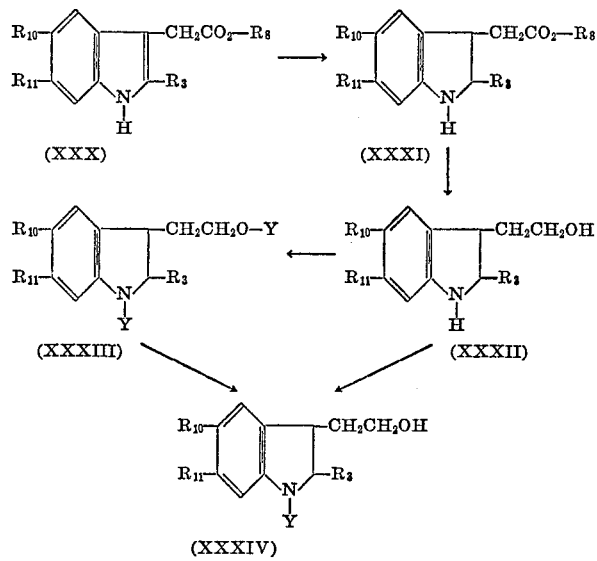

wherein $R_{11}$ is lowerf alkoxy, $R_{10}$ and $R_{11}$ taken together is methylenedioxy and $R_3$, $R_8$, $R_{10}$ and Y are as hereinabove defined. The reduction of the 3-indoleacetic esters (XXX) to the corresponding 3-indolineacetic esters (XXXI) is carried out in a manner analogous to the reduction of (XXV) to (XVI). Reduction of the 3-indolineacetic esters (XXI) with a metal hydride reagent, such as lithium aluminum hydride, is productive of the 3-indoline ethanols (XXXII). This last substance may be converted directly into the useful 1-acyl-3-indoline ethanol (XXXIV) by acylation under Schotten-Bauman conditions with the appropriate acyl halide (YCl or YBr) or acyl anhydride (Y₂O). Alternatively, treatment of (XXXII) with an acyl halide or acyl anhydride in a solvent such as pyridine, lutidine, collidine, and the like gives the O,N-diacyl derivative (XXXIII). Treatment of (XXXIII) with sodium methoxide in methanol then gives the important 1-acyl-3-indoline ethanol (XXXIV).

The compounds of General Formulae VI, XI and XII are physiologically active on the central nervous system and show high activity as tranquilizers at non-toxic doses. A useful test for transquilizer activity consists of measuring the reduction of spontaneous motor activity in animals by means of an actophotometer (a photoelectric device for quantitatively measuring locomotor activity). Graded doses of the active compounds prepared from the intermediates of this invention are administered to groups of mice, and the effective dosage range for a significant reduction of motor activity (a measure of tranquilization) compared to control groups is established. The use of reduced motor activity as a measure of tranquilizing activity has been described by W. D. Gray, A. C. Osterberg and C. E. Rauh, Archives Internationales et de Therapie, Vol. 134, p. 198 (1961) and W. J. Kinnard and C. J. Carr, Journal of Pharmacology and Experimental Therapeutics, Vol. 121, p. 354 (1957).

The effective dose that caused a 50% reduction in motor activity ($MDD_{50}$), expressed in milligrams per kilogram of body weight, of some typical compounds is set forth in Table I below.

TABLE I

| Compound | $MDD_{50}$ (mg./kg.) |
|---|---|
| 3 - [2 - (4 - phenyl-1-piperazinyl)ethyl]indoline dimaleate | 13 |
| 3 - {2 - [4-(o-methoxyphenyl)-1-piperazinyl]ethyl}- indoline trihydrochloride | 7 |
| 5,6 - dimethoxy-2-methyl-3-[2-(4-phenyl-1-piperazinyl)ethyl]indoline | 0.2 |
| 6,7 - dihydro - 7 - {2-[4-(o-methoxyphenyl)-1-piperazinyl]ethyl} - 5H - 1,3 - dioxolo[4,5-f]-indole difumarate | 1.1 |
| 5 - methoxy - 2-methyl-3-[2-(4-phenyl-1-piperazinyl) ethyl]indoline | 12 |
| 5 - methoxy - 2-methyl-3-{2-[4-(o-methoxyphenyl)-1- piperazinyl]ethyl}indoline | 25 |
| 5 - methoxy - 3 - {2-[4-(o-methoxyphenyl)-1-piperazinyl]ethyl}-2-methyl-6-nitroindoline | 19 |
| 3 - {2-[4-(o-methoxyphenyl)-1-piperazinyl]ethyl}-5- nitroindoline dihydrochloride | 6 |
| 5,6 - dimethoxy-3-{2-[4-(o-methoxyphenyl)-1-piperazinyl]ethyl}indoline trihydrochloride | 9 |

The compounds of General Formula II are active analgesics when measured by the "writhing syndrome" test for analgesic activity as described by Siegmund et al., Proc. Soc. Exptl. Biol. Med., Vol. 95, p. 729 (1957), with modifications. This method is based upon the reduction of the number of writhes following the intraperitoneal injection of one mg./kg. of body weight of phenyl-p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3 minute period commencing 15 minutes after injection of the phenyl-p-quinone. A compound is considered active if it reduces the total number of writhes in two test mice from a control value of approximately 30 per pair to a value of 18 or less per pair. If desired, the results of this test procedure for 10 pairs of mice at each of several dose levels may be used to determine a median effective dose ($ED_{50}$), defined as the dose required to reduce the number of writhes from about 30 per pair to 18 or less per pair in 50% of the pairs. In a representative operation, and merely by way of illustration, the following compounds are active analgesics when tested in this procedure at the indicated oral dose as set forth in Table II below:

TABLE II

| Compound | Oral Dose mg./kg. of body weight |
|---|---|
| 1 - acetyl - 5 - methoxy-2-methyl-3-[2-(4-phenyl-1- ethyl}indoline | 50 |
| 1 - acetyl - 3 - {2-[4-(o-chlorophenyl)-1-piperazinyl] ethyl}-5-methoxy-2-methylindoline | 100 |
| 1 - acetyl-5-methoxy-2-methyl-3-[2-(4-phenyl-1-piperazinyl)ethyl]indoline | 100 |
| 1 - acetyl - 5-methoxy-3{2-[4-(o-methoxyphenyl)-1- piperazinyl]ethyl}-2-methylindoline | 50 |

EXAMPLE 1

Preparation of 3-(2-hydroxyethyl)-2-indolinone

To a solution of 2.35 g. of oxindole-3-acetic acid [J. Am. Chem. Soc. 75, 5305 (1953)], in 18 ml. of tetrahydrofuran at −5° C. in an argon atmosphere is added 1.71 ml. of triethylamine and then 1.53 ml. of ethyl chlorocarbonate. The mixture is stirred at −5° C. for 30 minutes and then filtered. The filtrate is added dropwise to a cold solution of 1.16 g. of sodium borohydride in 18 ml. of water, and the solution is then stirred at ambient temperature for 2 hours. The reaction mixture is rendered strongly acid with hydrochloric acid and extracted with ethyl acetate. The organic extracts are washed successively with saturated sodium chloride solution, sodium hydroxide solution and with saturated sodium chloride solution. The organic extract is dried with magnesium sulfate and evaporated under reduced pressure leaving a clear gum which is crystallized from ether and recrysatllized from acetone-petroleum ether (30–60° C.) affording 3-(2-hydroxyethyl)-2-indolinone, M.P. 111–112° C.

EXAMPLE 2

Preparation of 3-indolineethanol

A solution of 531 mg. of 3-(2-hydroxyethyl)-2-indolinone in 35 ml. of tetrahydrofuran is purged with argon and 6.5 ml. of 1 M borane in tetrahydrofuran is added. The solution is heated under reflux for 18 hours, then the solvent is removed under reduced pressure. The residual glass is dissolved in 35 ml. of methanol and heated under reflux for 4 hours. The methanol is removed under reduced pressure and the residual gum is dissolved in 25 ml. of ethyl acetate. The organic solution is extracted with two 15 ml. portions of 1 N hydrochloric acid. The acid extract is rendered alkaline with sodium hydroxide and extracted with ethyl acetate. The organic extract is washed with saturated sodium chloride solution, dried with magnesium sulfate and evaporated under reduced pressure affording 3-indolineethanol as an oil.

EXAMPLE 3

Preparation of 1-acetyl-3-indolineethanol

To a suspension of 11.3 g. of 1-acetyl-3-indoline acetic acid [J. Org. Chem. 28, 2794 (1963)], in 90 ml. of tetrahydrofuran at 0° C. is added 9.0 ml. triethylamine. The resultant solution is stirred at −5° C. and 6.3 of ethyl chlorocarbonate is added dropwise. The reaction mixture is allowed to rise to 28° C. over a period of 30 minutes and then filtered free of triethylamine hydrochloride. The clear filtrate is added dropwise to a solution of 5.95 g. of sodium borohydride in 90 ml. of water stirred in an icebath and stirring is continued for two hours at room temperature. The reaction mixture is again stirred in an icebath and acidified with 1 N hydrochloric acid. The acid solution is extracted with ethyl acetate and the organic extract is washed with saturated sodium bicarbonate solution, dried with magnesium sulfate and concentrated under reduced pressure leaving a clear gum weighing 5.2 g. The crude product is dissolved in methylene chloride and passed thru a column of synthetic magnesium silicate collecting that fraction eluted by 2:8-acetone:methylene chloride. The resulting gum is crystallized from ethyl ether affording 2.5 g. of 1-acetyl-3-indolineethanol, M.P. 49–52° C.

EXAMPLE 4

Preparation of 1-acetyl-3-indolineethanol

To a suspension of 4.38 g. of 1-acetyl-3-indoline acetic acid in 45 ml. of tetrahydrofuran at 19° C. is added dropwise to 25 ml. of 1 M borane in tetrahydrofuran. The solution is stirred for one hour, then diluted with 20 ml. of water and 30 ml. of saturated sodium chloride solution. The mixture is extracted with ether and the organic extract is washed with saturated sodium bicarbonate solution and saturated sodium chloride solution, then extracted with 6 N hydrochloric acid solution. The acid extract is rendered alkaline with 10 N sodium hydroxide solution and extracted with ether. The ether extract is washed with saturated sodium chloride solution, dried with magnesium sulfate and evaporated under reduced pressure affording 3.02 g. of 1-acetyl-3-indolineethanol as a gum of sufficient purity for subsequent reactions.

EXAMPLE 5

Preparation of ethyl 5,6-dimethoxy-2-oxo-$\Delta^{3,\alpha}$-indolineglycolate To a solution of 4.82 g. of 5,6-dimethoxyoxindole [J. Am. Chem. Soc. 77, 3844 (1953)], in 50 ml. of dimethylformamide stirred in an ice-bath in an argon atmosphere is added 1.25 g. of a sodium hydride in oil dispersion (60.2% concentration). The mixture is stirred for 30 minutes and then a solution of 5.35 g. of diethyl oxalate in 25 ml. of dimethylformamide is added dropwise. The solution is stirred at ambient temperature for 18 hours, then diluted with 150 ml. of water. The aqueous solution is stirred in an ice-bath and acidified with hydrochloric acid. The resultant red solid is collected and recrystallized from acetone affording etheyl 5,6-dimethoxy-2-oxo-$\Delta^{3,\alpha}$-indolineglycolate, M.P. 183–185° C. dec.

EXAMPLE 6

Preparation of ethyl 5,6-dimethoxy-2-oxo-3-indolineacetate

To a suspension of 0.73 g. of 5,6-dimethoxy-2-oxo-indolineglycolic acid ethyl ester in 50 ml. of acetic acid is added freshly prepared zinc amalgam (from 11 g. zinc and 1.1 g. mercuric chloride). The mixture is stirred under reflux for 16 hours. The mixture is cooled and filtered and the filtrate is reduced in volume to 10 ml. under reduced pressure. The residue is diluted with 50 ml. of water and extracted with ether. The ether extract is washed with saturated sodium carbonate solution and saturated sodium chloride solution, then dried with magnesium sulfate and evaporated to dryness under reduced pressure. The resultant solid mass crystallizes from acetone-petroleum ether (30–60° C.) affording ethyl 5,6-dimethoxy-2-oxo-3-indolineacetate, M.P. 123–124° C.

EXAMPLE 7

Preparation of 5,6-dimethoxy-3-indolineethanol

To a solution of 1.95 g. of 5,6-dimethoxy-2-oxo-3-indolineacetic acid ethyl ester in 100 ml. of tetrahydrofuran stirred in an ice-bath in an argon atmosphere is added 40 ml. of 1 M borane in tetrahydrofuran. The mixture is stirred for 15 hours at ambient temperature and then heated under reflux for 18 hours. The solvent is removed under reduced pressure and the residue is heated at 100° C. with 100 ml. 1 N hydrochloric acid. The acid solution is cooled and washed with ethyl acetate, then cooled in an ice-bath and made alkaline with aqueous sodium hydroxide solution. The alkaline solution is extracted with ethyl acetate. The organic extract is washed with saturated sodium chloride, dried with magnesium sulfate and evaporated under reduced pressure affording 1.23 g. of 5,6-dimethoxy-3-indolineethanol as a gum.

EXAMPLE 8

Preparation of 6,7-dimethoxy-3-indolineethanol

To a partial solution of 2.93 g. of ethyl 5,6-dimethoxy-2-oxo-$\Delta^{3,\alpha}$-indolineglycolate in 150 ml. of tetrahydrofuran stirred at −5° C. in an atmosphere of argon is added 80 ml. of a 1 M solution of borane in tetrahydrofuran. The solution is stirred at −5° C. for one hour, stirring at ambient temperature for three hours and finally heated at reflux temperature for eighteen hours. The solvent is removed under reduced pressure and the residue is heated with 100 ml. of 1 N sodium hydroxide on the steam bath for one hour. The cooled alkaline solution is extracted with ethyl acetate. The ethyl acetate solution is extracted with 1 N hydrochloric acid. The hydrochloric acid extract is rendered alkaline with 5 N sodium hydroxide, extracted with ethyl acetate and the extract evaporated under reduced pressure affording 0.82 g. of 6,7-dimethoxy-3-indolineethanol.

EXAMPLE 9

Preparation of 1-acetyl-5,6-dimethoxy-3-indolineethanol

A solution of 1.23 g. of 5,6-dimethoxyindoline-3-ethanol in 60 ml. of 0.5 N hydrochlic acid is rendered alkaline with 10 N sodium hydroxide. The mixture is stirred in an ice-bath and 12 ml. of acetic anhydride is added dropwise. The mixture is stirred at ambient temperature for 15 minutes maintaining alkalinity by addition of sodium hydroxide solution. An additional 12 ml. of acetic anhydride is added and the mixture is stirred for one hour. The solution is extracted with ethyl acetate and the extracts are washed with saturated sodium chloride solution, dried with magnesium sulfate solution and evaporated under reduced pressure. The residual gum is crystallized from acetone-petroleum ether (30–60° C.) affording 1 - acetyl-5,6-dimethoxy-3-indolineethanol, M.P. 148–150° C.

EXAMPLE 10

Preparation of 4,5-methylenedioxy-2-nitrophenylacetic acid

A suspension of 25 g. of 4,5-methylenedioxyphenyl acetic acid [J. Org. Chem. 17, 568 (1952)], in 110 ml. of acetic acid is stirred at 15° C. while 40.5 ml. of concentrated nitric acid is added in portions maintaining the temperature at 40° C. The mixture is stirred for an additional 40 min., then added to 800 ml. of ice water. The 4,5-methylenedioxy-2-nitrophenylacetic acid is collected as 24.5 g. of yellow crystals, M.P. 185–188° C.

EXAMPLE 11

Preparation of methyl 4,5-methylenedioxy-2-nitrophenylacetate

A solution of 25 g. of 4,5-methylenedioxy-2-nitrophenylacetic acid and 1 ml. concentrated sulfuric acid in 500 ml. methanol is heated at reflux temperature for 18 hours. The solution is cooled and 5 g. of anhydrous sodium acetate is added. The resultant precipitate is collected and washed with water affording 17.8 g. of methyl 4,5-methylenedioxy-2-nitrophenylacetate, M.P. 106–108° C. Dilution of the filtrate with water affords an additional 5.8 g. of product, M.P. 106–108° C.

EXAMPLE 12

Preparation of methyl 2-amino-4,5-methylenedioxyphenylacetate

A mixture of 11 g. of methyl 2-nitro-4,5-methylenedioxyphenylacetate and 1.1 g. of 10 percent palladium-on-charcoal catalyst in 200 ml. of ethanol is shaken with hydrogen until the theoretical amount of hydrogen is absorbed. The reaction mixture is filtered free of catalyst and evaporated under reduced pressure affording methyl 2-amino-4,5-methylenedioxyphenylacetate as a white solid.

EXAMPLE 13

Preparation of 5,7-dihydro-6H-1,3-dioxolo[4,5-f]indol-6-one

A solution of 1.0 g. of methyl 2-amino-4,5-methylenedioxyphenylacetate in 5 ml. of acetic acid is purged with argon and heated under reflux for 1 hour. The hot acetic acid solution is stirred and diluted with water until crystals form. The mixture is cooled and 660 mg. of 5,7-dihydro-6H - 1,3 - dioxolo[4,5-f]indol-6-one, M.P. 222–225° C., is collected by filtration.

EXAMPLE 14

Preparation of ethyl 5,6-dihydro-6-oxo-7H-1,3-dioxolo-[4,5-f]indole-$\Delta^{7,\alpha}$-glycolate A solution of 5.31 g. of 5,7-dihydro-6H-1,3-dioxolo-[4,5-f]indol-6-one in 50 ml. of dimethylformamide is stirred in an ice-bath in an argon atmosphere with 1.45 g. of sodium hydride-in-oil dispersion (60.2 percent concentration) for 30 minutes. To the reaction mixture is added a solution of 6.07 ml. of diethyl oxalate in 25 ml. of dimethylformamide. The reaction solution is stirred at ambient temperature for 18 hours, then added to 150 ml. of water and acidified with concentrated hydrochloric acid. The resultant red precipitate is collected by filtration and recrystallized from acetone affording ethyl 5,6-dihydro-6-oxo - 7H - 1,3 - dioxolo[4,5-f]indole-$\Delta^{7,\alpha}$-glycolate, M.P. 246–248° C.

EXAMPLE 15

Preparation of ethyl 5,6-dihydro-6-oxo-7H-1,3-dioxolo-[4,5-f]indole-7-acetate

A suspension of 1.39 g. of ethyl 5,6-dihydro-6-oxo-7H-1,3-dioxolo[4,5-f]indole-$\Delta^{7,\alpha}$-glycolate and 1.39 g. of 10 percent palladium-on-charcoal catalyst in 50 ml. of acetic acid containing 0.25 ml. concentrated sulfuric acid is shaken with hydrogen until two mole equivalents of hydrogen are absorbed. The reaction mixture is filtered directly onto 1.0 g. of anhydrous sodium acetate and the filtrate is evaporated under reduced pressure. The residue is partitioned between water and ethyl acetate. The ethyl acetate solution is evaporated in vacuo and the residue crystallized from acetone-petroleum ether (30–60° C.) affording ethyl 5,6-dihydro-6-oxo-7H-dioxolo[4,5-f]indole-7-acetate, M.P. 151–152° C.

EXAMPLE 16

Preparation of ethyl 5,6-dihydro-6-oxo-7H-1,3-dioxolo-[4,5-f]indole-7-acetate

To a suspension of 1.39 g. of ethyl 5,6-dihydro-6-oxo-7H - 1,3-dioxolo[4,5-f]indole-$\Delta^{7,\alpha}$-glycolate in 50 ml. of acetic acid is added zinc amalgam prepared from 11 g. of zinc and 1.1 g. mercuric chloride. The mixture is stirred and heated at reflux for 18 hours, then cooled and filtered. The filtrate is evaporated under reduced pressure to a volume of 10 ml. and diluted with 100 ml. of water. The solution is extracted with ethyl acetate and the extracts washed successively with saline solution, sodium bicarbonate solution and with saline solution. The ethyl acetate is evaporated under reduced pressure and the residue crystallized from acetone-petroleum ether (30–60° C.) affording ethyl 5,6-dihydro-6-oxo-7H-1,3 - dioxolo[4,5-f] indole-7-acetate, M.P. 150–151° C.

EXAMPLE 17

Preparation of 6,7,-dihydro-5H-1,3-dioxolo[4,5-f]indole-7-ethanol

To a solution of 1.0 g. of ethyl 5,6-dihydro-6-oxo-7H-1,3-dioxolo[4,5-f]indole-7-acetate in 50 ml. of tetrahydrofuran stirred at −5° C. in an atmosphere of argon is added 21.8 ml. of a 1 M solution of borane in tetrahydrofuran. The solution is stirred at 0° C. for 15 minutes, at ambient temperature for 90 minutes and finally heated at reflux for 18 hours. The solvent is removed under reduced pressure and the residue is heated on the steam bath with 50 ml. of 1 N hydrochloric acid for one hour. The solution is washed with ethyl acetate, rendered alkaline with 10 N sodium hydroxide and extracted with ethyl acetate. The solvent is removed under reduced pressure leaving 0.6 g. of 6,7-dihydro-5H-1,3-dioxolo[4,5-f]indole-7-ethanol as an amber oil.

EXAMPLE 18

Preparation of 5-acetyl-6,7-dihydro-5H-1,3-dioxolo-[4,5-f]indole-7-ethyl acetate A solution of 0.6 g. of 6,7-dihydro-5H-1,3-dioxolo-[4,5-f]indole-7-ethanol in 10 ml. of pyridine and 0.9 ml. of acetic anhydride is heated on the steam bath for two hours. The solution is cooled, diluted with water and extracted with ethyl acetate. The extract is washed with 1 N hydrochloric acid and saline solution and evaporated under reduced pressure. The residue is crystallized from acetone-petroleum ether (30–60° C.) affording 5-acetyl-6,7 - dihydro-5H-1,3-dioxolo[4,5-f]indole-7-ethylacetate, M.P. 93–94° C.

EXAMPLE 19

Preparation of 5-acetyl-6,7-dihydro-5H-1,3-dioxolo[4,5-f]indole-7-ethanol

A solution of 200 mg. of 5-acetyl-6,7-dihydro-5H-1,3-dioxolo[4,5-f]indole-7-ethylacetate and 40 mg. of sodium methoxide in 10 ml. of methanol is heated at reflux for 2 hours then evaporated under reduced pressure. The residue is partitioned between ethyl acetate and water. The ethyl acetate solution is separated and evaporated under reduced pressure. The residue is crystallized from acetone-petroleum ether (30–60° C.) affording 5-acetyl-6,7-dihydro-5H-1,3-dioxolo[4,5-f]indole-7-ethanol, M.P. 140–141° C.

EXAMPLE 20

Preparation of 1-acetyl-5-nitro-3-indoline acetic acid

To a stirred mixture of 34.21 g. (0.16 mol) of 1-acetyl-3-indoline acetic acid [J. Org. Chem., 28, 2794 (1963)], and 450 ml. of glacial acetic acid is added dropwise at 15° C. 233 ml. of 90% fuming nitric acid. The resulting solution is stirred at room temperature for one hour and then poured onto 1100 g. of cracked ice. The solid is collected by filtration to give 32.25 g. of bright yellow crystals, M.P. 208–211° C.

EXAMPLE 21

Preparation of 1-acetyl-5-bromo-3-indolineacetic acid

A solution of 4.00 g. (25 mmol, 1.3 ml.) of bromine in 12.5 ml. of acetic acid is added dropwise to a stirred mixture of 5.10 g. (22.5 mmol) of 1-acetyl-3-indolineacetic acid in 25 ml. of glacial acetic acid. The resulting solution is stirred at ambient temperature for 90 min. and is then poured into 150 ml. of water. The precipitated solid is recrystallized from isopropyl alcohol to give white crystals, M.P. 195–197° C.

EXAMPLE 22

Preparation of 1-acetyl-5-chloro-3-indolineacetic acid

A solution of 1.55 g. (22 mmol) of chlorine in 15 ml. of glacial acetic acid is added to a stirred mixture of 4.40 g. (20 mmol) of 1-acetyl-3-indolineacetic acid in 20 ml. of acetic acid. The mixture is stirred at ambient temperature for one hour, during which the solid is dissolved. The solution is diluted with water, and the precipitated solid is recrystallized from isopropyl alcohol to give white crystals, M.P. 190–193° C.

EXAMPLE 23

Preparation of 1-acetyl-5-nitro-3-indolineethanol

To a stirred mixture of 29.43 g. (0.118 mol) of 1-acetyl-5-nitro-3-indoline acetic acid in 500 ml. of tetrahydrofuran is added dropwise over 45 minutes 120 ml. of 1 M borane in tetrahydrofuran solution. The resulting solution is stirred at room temperature for 90 minutes, whereafter 25 ml. of water is added dropwise. The solvents are removed under reduced pressure, and the residue is distributed between ethyl acetate and sodium carbonate solution. The organic layer is washed with additional sodium carbonate solution, dried and concentrated under reduced pressure until a mass of yellow crystals separate. The solid is recrystallized from ethyl acetate-heptane to give yellow crystals, M.P. 139–141° C.

EXAMPLE 24

Preparation of 1-acetyl-5-bromo-3-indolineethanol

In the manner described in Example 23 treatment of 6.07 g. (20.4 mmol) of 1-acetyl-5-bromo-3-indolineacetic acid in 50 ml. of tetrahydrofuran with 20 ml. of 1 M borane in tetrahydrofuran solution gives white crystals.

EXAMPLE 25

Preparation of 1-acetyl-5-chloro-3-indoleethanol

In the manner described in Example 23 treatment of 3.29 g. (13 mmol) of 1-acetyl-5-chloro-3-indolineacetic acid in 50 ml. of tetrahydrofuran with 13 ml. of 1 M borane in tetrahydrofuran solution affords white crystals, M.P. 103–106° C. Recrystallization several times from acetone-hexane raises the M.P. to 118–119° C.

EXAMPLE 26

Preparation of 1-acetyl-5-amino-3-indolineethanol

A mixture of 3.0 g. (0.012 mole) of 1-acetyl-5-nitro-3-indolineethanol and 300 mg. of 83% platinum oxide in 200 ml. of ethanol is shaken under 40 p.s.i. of hydrogen for 30 min. The catalyst is separated by filtration and the filtrate is dried over magnesium sulfate and concentrated to yield 1-acetyl-5-amino-3-indolineethanol as a yellow oil.

EXAMPLE 27

Preparation of N-[1-acetyl-3-(2-acetoxyethyl)-5-indolinyl]acetamide

A solution of 3.1 g. (0.014 mole) of 1-acetyl-5-amino-3-indolineethanol in 40 ml. of pyridine and 5 ml. of acetic anhydride is warmed on a steam bath for 30 min. After dilution with water the mixture is extracted with ethyl acetate. The extract is washed with 1 N hydrochloric acid, dried over magnesium sulfate, and concentrated. The residue is crystallized from acetone to yield N-[1-acetyl-3-(2 - acetoxyethyl)-5-indolinyl]-acetamide, M.P. 163–164° C.

EXAMPLE 28

Preparation of N-[1-acetyl-3-(2-hydroxyethyl)-5-indolinyl]acetamide

A mixture of 1.4 g. (0.0046 mole) of N-[1-acetyl-3-(2-hydroxyethyl)-5-indolinyl]acetamide, acetate and 0.50 g. (0.0093 mole) of sodium methoxide in 40 ml. of methanol is stirred under reflux for 30 min. The methanol is removed by distillation and the residual oil is dissolved in water and extracted with ethyl acetate. The extract is dried over magnesium sulfate and concentrated. The residue is recrystallized from acetone-ether to yield N-[1-acetyl-3-(2-hydroxyethyl) - 5 - indolinyl]acetamide, M.P. 181–182° C.

EXAMPLE 29

Preparation of ethyl 5-methoxy-2-methyl-3-indolineacetate

A mixture of 25 g. (0.11 mole) of 5-methoxy-2-methyl-3-indoleacetic acid, 260 ml. of hydrochloric acid, 260 ml. of ethanol and 104 g. of tin is heated under reflux three days and filtered. The filtrate is concentrated and the residual oil is dissolved in ethanol previously saturated with hydrogen chloride. This mixture is stirred under reflux for 16 hours and then concentrated. The concentrate is rendered alkaline with saturated sodium bicarbonate solution. The mixture is filtered and the filtrate is extracted with ether. The ether extract is washed with saturated sodium bicarbonate and saturated sodium chloride solution, dried over magnesium sulfate, filtered, and concentrated to yield ethyl 5-methoxy-2-methyl-3-indolineacetate a lightly colored oil.

EXAMPLE 30

Preparation of 2-methyl-5-methoxy-3-indolineethanol

To a stirred suspension of 7.5 g. (0.20 mol) of lithium aluminum hydride in 1.5 l. tetrahydrofuran is added 27 g. (0.11 mol) of ethyl 2-methyl-5-methoxy-3-indolineacetic acid. The mixture is stirred at reflux for 18 hours, cooled and an aqueous solution of sodium potassium tartrate is added. The reaction mixture is filtered and the filter cake is washed with ethyl acetate. The filtrate is concentrated to an oil which is dissolved in benzene, treated with activated carbon, dried over magnesium sulfate, filtered through diatomaceous earth and evaporated under reduced pressure. The resulting oil is cooled in the refrigerator to afford 2-methyl-5-methoxy-3-indolineethanol as gray white crystals, M.P. 79–81° C.

EXAMPLE 31

Preparation of 1-acetyl-2-methyl-5-methoxy-3-indolineethanol

To a stirred suspension of 10 g. (0.05 mole) of 2-methyl-5-methoxy-3-indolineethanol in 0.5 l. of 10 N sodium hydroxide is added 9.9 g. (0.10 mole) acetic anhydride. After being allowed to stir overnight the reaction mixture is extracted with ethyl acetate. The organic layer is washed with 1 N hydrochloric acid and saturated aqueous sodium chloride. The organic layer is dried over magnesium sulfate, filtered and the filtrate concentrated to a clear oil. The oil is suspended in 1 l. of 2 N sodium hydroxide solution and allowed to stir overnight. The reaction mixture is filtered and the filter cake washed with ether and petroleum ether to afford 1-acetyl-2-methyl-5-methoxy-3-indolineethanol as off-white crystals, M.P. 71–73° C.

EXAMPLE 32

Preparation of 1-acetyl-2-methyl-5-methoxy-6-nitro-3-indolineethanol

A solution of 1.00 g. of 1-acetyl-2-methyl-5-methoxy-3-indolineethanol in 25 ml. of glacial acetic acid is stirred in an ice bath and treated with 1 ml. of fuming nitric acid. The solution is stirred at room temperature for one hour and poured onto cracked ice to give orange crystals of 1-acetyl-2-methyl-5-methoxy-6-nitro-3-indolineethanol.

EXAMPLE 33

Preparation of ethyl 5,6-dimethoxy-2-methyl-3-indole acetate

A mixture of 3.8 g. (0.019 mole) of 3,4-dimethoxyphenylhydrazine hydrochloride, 2.4 ml. (0.017 mole) of ethyl levulinate, and 40 ml. of ethanolic hydrogen chloride is stirred under reflux for 30 minutes. The ethanol is evaporated under reduced pressure and the residue is diluted with water and extracted with ether. The extract is washed with aqueous sodium bicarbonate solution, dried over magnesium sulfate, and concentrated under reduced pressure. Crystallization from ether-petroleum ether affords ethyl 5,6-dimethoxy-2-methyl-3-indole acetate, M.P. 78–79° C.

EXAMPLE 34

Preparation of ethyl 5,6-dimethoxy-2-methyl-3-indoline acetate

A mixture of 3.0 g. (0.011 mole) of ethyl 5,6-dimethoxy-2-methyl-3-indole acetate, 7.0 g. (0.059 mole) of tin, 35 ml. of ethanol, and 35 ml. of concentrated hydrochloric acid is heated under reflux for one hour. An additional 7.0 g. (0.059 mole) of tin is added and the mixture is heated under reflux for six hours. Excess tin is separated by filtration and the filtrate is evaporated under reduced pressure. The residue is diluted with water, rendered alkaline with aqueous sodium hydroxide solution, and extracted with ethyl acetate. The extract is dried over magnesium sulfate and concentrated under reduced pressure to yield ethyl 5,6-dimethoxy-2-methyl-3-indoline acetate as a yellow oil.

EXAMPLE 35

Preparation of 5,6-dimethoxy-2-methyl-3-indolineethanol

A suspension of 10 g. (0.26 mole) of lithium aluminum hydride in 300 ml. of tetrahydrofuran is stirred under an argon atmosphere while a solution of 20 g. (0.072 mole) of ethyl 5,6-dimethoxy-2-methyl-3-indolineacetate in 100 ml. of tetrahydrofuran is added. The mixture is stirred under reflux for two hours and then treated with aqueous sodium potassium tartrate solution. The precipitate is separated by filtration and washed with ethyl acetate. The filtrate is dried over magnesium sulfate and concentrated under reduced pressure to yield 5,6-dimethoxy-2-methyl-3-indolineethanol as a yellow oil.

EXAMPLE 36

Preparation of 1-benzoyl-5,6-dimethoxy-2-methyl-3-indolineethyl benzoate

A solution of 16 g. (0.069 mole) of 5,6-dimethoxy-2-methyl-3-indolineethanol in 100 ml. of pyridine is stirred while 16 g. (0.14 mole) of benzoyl chloride is added dropwise. The mixture is heated on a steam bath for 30 minutes and then partitioned between water and methylene chloride. The organic layer is separated, washed with aqueous sodium hydroxide solution and dilute hydrochloric acid, dried over magnesium sulfate, and concentrated under reduced pressure. The residual oil is crystallized from ether and recrystallized from methanol to yield 1-benzoyl - 5,6 - dimethoxy-2-methyl-3-indolineethyl benzoate, M.P. 135–136° C.

EXAMPLE 37

Preparation of 1-benzoyl-5,6-dimethoxy-2-methyl-3-indolineethanol

To a suspension of 3.0 g. (0.0068 mole) of 1-benzoyl-5,6-dimethoxy-2-methyl-3-indolineethyl benzoate in 20 ml. of methanol is added 1.5 g. (0.028 mole) of sodium methoxide. The mixture is stirred under reflux for one hour and then evaporated under reduced pressure. The residue is diluted with water and extracted with ethyl acetate. The extract is dried over magnesium sulfate and concentrated in vacuo to yield 1-benzoyl-5,6-dimethoxy-2-methyl-3-indolineethanol as a yellow oil.

EXAMPLE 38

Preparation of 5-methoxy-2-methyl-1-(p-nitrobenzoyl)-3-indolineethanol

A solution of 415 mg. (2.0 mmol) of 5-methoxy-2-methyl-3-indolineethanol in 5 ml. of methylene chloride is treated with 200 mg. (5.0 mmol) of sodium hydroxide in 5 ml. of water. The mixture is treated with a solution of 375 mg. (2.0 mmol) of p-nitrobenzoyl chloride in 5 ml. of methylene chloride and stirred at room temperature for 16 hours. The mixture is separated, and the organic layer is washed with water and saline, dried and evaporated to give a yellow oil which crystallizes from ether-hexane to give yellow prisms, M.P. 135–138° C.

EXAMPLE 39

Preparation of 5-methoxy-2-methyl-1-(p-chlorobenzoyl)-3-indolineethanol

A solution of 415 mg. (2.0 mmol) of 5-methoxy-2-methyl-3-indolineethanol in 10 ml. of methylene chloride is treated with 365 mg. (2.05 mmol) of p-chlorobenzoyl chloride in methylene chloride. The resulting mixture is stirred at ambient temperature for 16 hours. The organic layer is separated, washed with water and evaporated to give a white glass.

EXAMPLE 40

Preparation of 1-acetyl-3-(2-bromoethyl)indoline

To a solution of 410 mg. of 1-acetyl-3-indolineethanol in 25 ml. of benzene in an argon atmosphere is added 0.117 ml. of phosphorous tribromide and one drop of pyridine. The resultant mixture is heated under reflux for 18 hours. The reaction mixture is cooled and the benzene solution decanted into 20 ml. of ice-water and 10 ml. saturated sodium bicarbonate solution. The organic solution is separated, washed with saturated sodium bicarbonate solution and saturated sodium chloride solution and dried with magnesium sulfate solution. The solvent is removed under reduced pressure and the resulting gum is crystallized from an acetone-hexane mixture affording 1-acetyl-3-(2-bromoethyl)indoline, M.P. 80–82° C.

EXAMPLE 41

Preparation of 1-acetyl-3-(2-bromoethyl)-5,6-dimethoxyindoline

To a partial solution of 254 mg. of 1-acetyl-5,6-dimethoxy-3-indolineethanol in 25 ml. of benzene in an argon atmosphere is added one drop of pyridine and 0.056 ml. of phosphorous tribromide. The mixture is stirred and heated under reflux for 18 hours. The reaction mixture is cooled and the benzene solution is decanted into 20 ml. of ice-water and 5 ml. of saturated sodium bicarbonate solution. The organic solution is separated, washed with saturated sodium bicarbonate solution and saturated sodium chloride solution. The organic extract is dried with magnesium sulfate, evaporated to dryness under reduced pressure and the residual gum crystallized from acetone-petroleum ether (30–60° C.) affording 1-acetyl-3-(2-bromoethyl)-5,6-dimethoxyindoline, M.P. 103–105° C.

EXAMPLE 42

Preparation of 5-acetyl-6,7-dihydro-5H-1,3-dioxolo-[4,5-f]indole-7-ethyl bromide To a partial solution of 1.5 g. of 5-acetyl-6,7-dihydro-5H-1,3-dioxolo[4,5-f]indole-7-ethanol in 150 ml. of benzene purged with argon is added 10 drops of pyridine, and 0.35 ml. of phophorus tribromide. The mixture is stirred and heated at reflux for 18 hours. The mixture is cooled and the supernatant liquid is poured into 120 ml. of stirred ice-water and 70 ml. of saturated sodium bicarbonate solution. The organic phase is separated and evaporated under reduced pressure. The residual solid is crystallized from acetone-petroleum ether (B.P. 30–60° C.) affording 5-acetyl-6,7-dihydro-5H-1,3 - dioxolo[4,5-f]indole-7-ethyl bromide, M.P. 147–148° C.

EXAMPLE 43

Preparation of 1-acetyl-5-nitro-3-indolineethyl p-toluenesulfonate

A solution of 1.0 g. (0.0040 mole) of 1-acetyl-5-nitro-3-indolineethanol and 1.5 g. (0.0080 mole) of p-toluenesulfonyl chloride in 20 ml. of pyridine is maintained at 0° C. for 18 hours. The mixture is poured into ice-water and extracted with ethyl acetate. The extract is washed with 1 N hydrochloric acid, dried over magnesium sulfate, and concentrated. The residue is crystallized from ether-petroleum ether to yield 1-acetyl-5-nitro-3-indoline ethyl p-toluenesulfonate, M.P. 118–120° C.

EXAMPLE 44

Preparation of 1-acetyl-3-(2-bromoethyl)-5-chloroindoline

A mixture of 1.19 g. (5 mmol) of 1-acetyl-5-chloro-3-indolineethanol, 0.29 ml. of phosphorus tribromide and 3 drops of pyridine in 50 ml. of benzene is heated at reflux temperature for 16 hours. The supernatant solution is decanted from an orange sludge onto cracked ice-water. The organic layer is washed with sodium carbonate solution, dried over magnesium sulfate and evaporated. Trituration of the residue with petroleum ether (B.P. 30–60° C.) gives white crystals, M.P. 115–117° C. Recrystallization from acetone-hexane raises the M.P. to 120–121° C.

EXAMPLE 45

Preparation of 1-acetyl-3-(2-bromoethyl)-2-methyl-5-methoxyindoline

In the manner described in Example 40 from 430 mg. (0.0017 mol) 1-acetyl-2-methyl-5-methoxy-3-indolineethanol and 440 mg. (0.0017 mole) of phosphorous tribromide there is obtained 1-acetyl-3-(2-bromoethyl)-2-methyl-5-methoxyindoline as a cream colored solid, M.P. 108–110° C.

EXAMPLE 46

Preparation of 3-(2-bromoethyl)-5-methoxy-2-methyl-1-(p-nitrobenzoyl)indoline

A mixture of 356 mg. (1.0 mmol) of 5-methoxy-2-methyl-1-(p-nitrobenzoyl)-3-indolineethanol and 135 mg. (0.5 mmol) of phosphorus tribromide in 20 ml. of benzene containing a drop of pyridine is heated at reflux temperature for 16 hours. The organic solution is washed with a 5% sodium hydroxide solution and then with saline. The dried solution is evaporated to give an oil that is chromatographed on silicic acid. After removal of an impurity by elution with hexane-methylene chloride (1:1), the product is eluted with methylene chloride. This material crystallizes from acetone-hexane to give yellow crystals, M.P. 156–158° C.

EXAMPLE 47

Preparation of 1-(p-chlorobenzoyl)-3-(2-chloroethyl)-5-methoxy-2-methylindoline

A solution of 500 mg. (2.0 mmol) of 5-methoxy-2-methyl-1-(p-chlorobenzoyl)-3-indolineethanol and 240 mg. (2.0 mmol) of thionyl chloride in 25 ml. of benzene is heated at reflux temperature for 2 hours. An additional 240 mg. (2.0 mmol) of thionyl chloride is added and the reaction is continued for one hour. Thin layer chromatography now shows the reaction to be complete. The solution is diluted with benzene, and washed successively with water, sodium bicarbonate solution and water, dried, and evaporated to give an oil.

EXAMPLE 48

Preparation of 3-(2-chloroethyl)-5-methoxy-2-methylindoline

A solution of 1.45 g. (7.0 mmol) of 5-methoxy-2-methyl-3-indolineethanol in 50 ml. of benzene is treated with 830 mg. (7.0 mmol) of thionyl chloride. The solution is heated at reflux temperature for one hour and then cooled. Additional benzene is added, and this solution is washed with a 2% sodium hydroxide solution and water. Removal of the solvent gives the product as a mobile liquid.

EXAMPLE 49

Preparation of 1-benzoyl-3-(2-bromoethyl)-5,6-dimethoxy-2-methylindoline

A solution of 2.6 g. (0.0075 mole) of 1-benzoyl-5,6-dimethoxy-2-methyl-3-indolineethanol in 25 ml. of benzene is stirred under an argon atmosphere while two drops of pyridine, and 0.40 ml. (0.0042 mole) of phosphorus tribromide are added. The mixture is stirred under reflux for two hours and then poured into an ice-cold aqueous sodium bicarbonate solution. The ether extract of this mixture is washed with saturated aqueous sodium chloride solution, dried over magnesium sulfate, and concentrated under reduced pressure. Crystallization of the residue from ether, affords 1-benzoyl-3-(2-bromoethyl)-5,6-dimethoxy-2-methylindoline, M.P. 125–127° C.

EXAMPLE 50

Preparation of 1-acetyl-3-(2-bromoethyl)-5-methoxy-2-methyl-6-nitroindoline

To 50 ml. glacial acetic acid is added 2.22 g. (0.00712 mole) of 1-acetyl-3-(2-bromoethyl)-2-methyl-5-methoxyindoline at ice bath temperature. To this stirred solution is added dropwise with stirring 0.448 g. (0.00712 mole) fuming nitric acid. The reaction mixture is stirred at room temperature for one hour, poured onto ice water and extracted with ethyl acetate. The organic extract is washed with saturated sodium chloride solution, dried over magnesium sulfate, clarified with carbon and evaporated to give an oil. Crystallization from heptane affords 1-acetyl-3-(2-bromoethyl) - 5 - methoxy - 2 - methyl-6-nitroindoline, M.P. 148–150° C.

EXAMPLE 51

Preparation of 1-acetyl-3-(2-bromoethyl)-5-methoxy-2-methyl-6-nitroindoline

By the procedure of Example 49 treatment of 1-acetyl-2-methyl-5-methoxy-6-nitro-3-indolineethanol in benzene with phosphorus tribromide give yellow crystals of 1-acetyl-3-(2-bromoethyl)-5-methoxy - 2 - methyl-6-nitroindoline, M.P. 147–150° C.

EXAMPLE 52

Preparation of 1-acetyl-5-bromo-3-(2-bromoethyl)indoline

In the manner described in Example 40 treatment of 1-acetyl-5-bromo-3-indolineethanol with phosphorus tribromide in benzene is productive of 1-acetyl-5-bromo-3-(2-bromoethyl)indoline.

EXAMPLE 53

Preparation of 5-methoxy-2-methyl-1-(p-nitrobenzoyl)-3-indolineethyl methanesulfonate A solution of 1.00 g. of 5-methoxy-2-methyl-1-(p-nitrobenzoyl)-3-indolineethanol and 1 ml. of methanesulfonyl chloride in 20 ml. of pyridine is maintained at 0° C. for 18 hours. The mixture is poured into ice-water and extracted with ethyl acetate. The extract is washed with 1 N hydrochloric acid, dried over magnesium sulfate and evaporated to give the methanesulfonate.

EXAMPLE 54

Preparation of N-[1-acetyl-3-(2-methanesulfonyloxyethyl)-5-indolinyl]acetamide

A solution of 2.00 g. of N-[1-acetyl-3-(2-hydroxyethyl)-5-indolinyl]acetamide and 2 ml. of methanesulfonyl chloride in 20 ml. of pyridine is maintained at 0° C. for 18 hours. The mixture is poured onto a cracked ice-hydrochloric acid mixture, which is then extracted with methylene chloride. The dried extract is evaporated to give N-[1-acetyl-3-(2-methanesulfonyloxyethyl)-5-indolinyl]acetamide.

EXAMPLE 55

Preparation of 1-acetyl-3-[2-(4-phenyl-1-piperazinyl)ethyl]indoline

A solution of 268 mg. of 1-acetyl-3-(2-bromoethyl)indoline and 340 mg. of 1-phenylpiperazine in 20 ml. of toluene is heated under reflux for 18 hours. The mixture is cooled and the toluene solution is decanted and evaporated under reduced pressure. The residual gum is dissolved in ethyl acetate and the organic solution is washed with water and saturated sodium bicarbonate solution. The organic solution is dried with magnesium sulfate and evaporated under reduced pressure leaving a gum which is crystallized from ether-petroleum ether (30–60° C.) to afford 1-acetyl-3-[2-(4-phenyl-1-piperazinyl)ethyl]indoline, M.P. 107–109° C.

EXAMPLE 56

Preparation of 1-acetyl-3-{2-[4-(o-methoxyphenyl)-1-piperazinyl]ethyl}indoline

In the manner described in Example 55, from 2.5 g. of 1-acetyl-3-(2-bromoethyl)indoline and 3.5 g. of 1-(o-methoxyphenyl)piperazine there is obtained 1-acetyl-3-{2-[4-(o - methoxyphenyl)-1-piperazinyl]ethyl}indoline, M.P. 77–80° C.

EXAMPLE 57

Preparation of 1-acetyl-5,6-dimethoxy-3-{2-[4-(o-methoxyphenyl)-1-piperazinyl]ethyl}indoline A solution of 200 mg. of 1-acetyl-3-(2-bromoethyl)-5,6-dimethoxyindoline and 250 mg. of 1-(o-methoxyphenyl)piperazine in 20 ml. of toluene is heated under reflux for 18 hours. The reaction mixture is cooled and filtered, and the filtrate is evaporated under reduced pressure. The residual gum is partitioned between ether and water. The organic solution is separated washed with saturated sodium bicarbonate solution and sodium chloride solution. The ether solution is dried with magnesium sulfate and evaporated under reduced pressure. The residual gum is crystallized from ether-petroleum ether affording 1-acetyl - 5,6 - dimethoxy-3-{2-[4-(o-methoxyphenyl)-1-piperazinyl]ethyl}indoline, M.P. 149–150° C.

EXAMPLE 58

Preparation of 1-acetyl-5,6-dimethoxy-3-[2-(4-phenyl-1-piperazinyl)ethyl]indoline In the manner described in Example 57 treatment of 2.37 g. (7.24 mmol) of 1-acetyl-3-(2-bromoethyl)-5,6-dimethoxyindoline with 2.35 g. (14.5 mmol) of 1-phenylpiperazine in 150 ml. of boiling toluene for 17 hours produces 1-acetyl-5,6-dimethoxy-3-[2-(4-phenyl-1-piperazinyl)ethyl]indoline.

EXAMPLE 59

Preparation of 1-acetyl-5,6-dimethoxy-3-{2-[4-(p-methoxyphenyl)-3-methyl-1-piperazinyl]ethyl}indoline In the manner described in Example 57 treatment of 2.30 g. (7.02 mmol) of 1-acetyl-3-(2-bromoethyl)-5,6-dimethoxyindoline with 2.90 g. (14.1 mmol) of 1-(p-methoxyphenyl)-2-methylpiperazine in 150 ml. of boiling toluene for 15 hours produces 1-acetyl-5,6-dimethoxy-3-{2-[4-(p-methoxyphenyl)-3-methyl - 1 - piperazinyl]ethyl}indoline.

EXAMPLE 60

Preparation of 1-acetyl-3-{2-[4-(o-methoxyphenyl)-1-piperazinyl]ethyl}-5-nitroindoline A solution of 1.3 g. (0.0033 mole) of 1-acetyl-5-nitro-3-indolineethanol, p-toluenesulfonate and 1.3 g. (0.0068 mole) of 1-(o-methoxyphenyl)piperazine in 25 ml. of toluene is stirred under reflux for 72 hours and then concentrated by distillation. The residue is diluted with water and extracted with ethyl acetate. The organic layer is separated and extracted with 1 N hydrochloric acid and the acidic solution is rendered alkaline with 10 N aqueous sodium hydroxide and extracted with ethyl acetate. This extract is dried over magnesium sulfate, clarified with activated carbon, and concentrated to a yellow oil. Pure 1-acetyl-3-{2-[4-(o-methoxyphenyl)-1-piperazinyl]ethyl}-5-nitroindoline, M.P. 141–143° C., is obtained by chromatography using a synthetic magnesia-silica column.

EXAMPLE 61

Preparation of 5-acetyl-6,7-dihydro-7-{2-[3-methyl-4-(p-tolyl)piperazinyl]ethyl}-5H-1,3-dioxolo[4,5-f]indole In the manner described in Example 57, from 850 mg. of 5 - acetyl-6,7-dihydro-5H-1,3-dioxolo[4,5-f]indole-7-ethyl bromide and 1.23 g. of 2-methyl-1-(p-tolylpiperazine) is obtained 5-acetyl-6,7-dihydro-7-{2-[3-methyl-4-

(p - tolyl)piperazinyl]ethyl}-5H-1,3-dioxolo[4,5-f]indole, M.P. 156–157° C.

EXAMPLE 62

Preparation of 5-acetyl-6,7-dihydro-7-{2-[4-(o-tolyl) piperazinyl]ethyl}-5H-1,3-dioxolo[4,5-f]indole In the manner described in Example 57, from 1.0 g. of 5-acetyl-6,7-dihydro-5H-1,3-dioxolo[4,5-f]indole - 7 - ethylbromide and 1.23 g. of 1-(o-tolylpiperazine) is obtained 5-acetyl-6,7-dihydro-7-{2 - [4-(o-tolyl)piperazinyl]ethyl}-5H-1,3-dioxolo[4,5-f]indole, M.P. 166–168° C.

EXAMPLE 63

Preparation of 5-methoxy-3-{2-[4-(o-methoxyphenyl)-1-piperazinyl]ethyl}-2-methyl-1-(p-nitrobenzoyl)indoline In the manner described in Example 57 treatment of 5-methoxy-2-methyl-1-(p-nitrobenzoyl) - 3 - indolinethyl methanesulfonate gives the product as a viscous oil.

EXAMPLE 64

Preparation of 5-methoxy-2-methyl-3-[2-(4-phenyl-1-piperazinyl)ethyl]-1-(p-nitrobenzoyl)indoline In the manner described in Example 57 treatment of 3-(2 - bromoethyl)-5-methoxy-2-methyl-1-(p-nitrobenzoyl) indoline with 1-phenylpiperazine gives 5-methoxy-2-methyl-3-[2-(4-phenyl-1-piperazinyl)ethyl] - 1 - (p-nitrobenzoyl)indoline.

EXAMPLE 65

Preparation of 5-acetyl-6,7-dihydro-7-{2-[4-(m-tolyl) piperazinyl]ethyl}-5H-1,3-dioxolo[4,5-f]indole In the manner described in Example 57, from 950 mg. of 5-acetyl - 6,7 - dihydro-5H-1,3-dioxolo[4,5-f]indole-7-ethyl bromide and 1.2 g. of 1-(m-tolyl)piperazine is obtained 5-acetyl-6,7-dihydro-7-{2-[4-(m-tolyl)piperazinyl] ethyl}-5H-1,3-dioxolo[4,5-f]indole, M.P. 98–103° C.

EXAMPLE 66

Preparation of 5-acetyl-6,7-dihydro-7-{2-[4-(o-methoxyphenyl)piperazinyl]ethyl}-5H-1,3-dioxolo[4,5-f]indole In the manner described in Example 57, from 1.25 g. of 5-acetyl-6,7-dihydro-5H - 1,3 - dioxolo[4,5-f]indole-7-ethyl bromide and 1.51 g. of 1-(o-methoxyphenyl)piperazine is obtained 5-acetyl-6,7-dihydro-7-{2-[4-(o-methoxyphenyl)piperazinyl]ethyl}-5H-1,3 - dioxolo[4,5-f]indole, M.P. 159–160° C.

EXAMPLE 67

Preparation of 1-acetyl-5-chloro-3-{2-[4-(m-tolyl)-3-methyl-1-piperazinyl]ethyl}indoline In the manner described in Example 57 treatment of 1.00 g. (3.32 mmol) of 1-acetyl-3-(2-bromoethyl)-5-chloroindoline with 1.26 g. (6.64 mmol) of 1-(m-tolyl)-2-methylpiperazine gives 1.31 g. of an oil that crystallizes from ether-petroleum ether (B.P. 30–60° C.) to give white crystals, M.P. 105–110° C. Recrystallization from acetone-hexane raises the M.P. to 130–132° C.

EXAMPLE 68

Preparation of 1-acetyl-5-methoxy-3-{2-[4-(o-methoxyphenyl)-1-piperazinyl]ethyl}-2-methylindoline In the manner described in Example 57 treatment of 780 mg. (2.5 mmol) of 1-acetyl-3-(2-bromoethyl)-2-methyl-5-methoxyindoline with 1.83 g. (9.5 mmol) of 1-(o-methoxyphenyl)piperazine gives the product as white crystals, M.P. 87–89° C.

EXAMPLE 69

Preparation of N-{1-acetyl-3-[2-(4-o-methoxyphenyl-1-piperazinyl)ethyl]-5-indolinyl}acetamide In the manner described in Example 57 treatment of N-(1-acetyl-3-(2-methanesulfonyloxyethyl) - 5 - indolinyl]acetamide with 1 - (o-methoxyphenyl)piperazine provides N-{1-acetyl-3-[2-(4-o-methoxyphenyl)-1-piperazinyl)ethyl]-5-indolinyl}acetamide.

EXAMPLE 70

Preparation of 1-acetyl-5-methoxy-2-methyl-3-[2-(4-phenyl-1-piperazinyl)ethyl]indoline By the procedure of Example 57 treatment of 2.00 g. (10 mmol) of 1 - acetyl-3-(2-bromoethyl)-2-methyl-5-methoxyindoline with 3.10 g. (20 mmol) of 1-phenylpiperazine furnishes the product as off-white crystals, M.P. 127–129° C.

EXAMPLE 71

Preparation of 1-acetyl-3-{2-[4-(o-chlorophenyl)-1-piperazinyl]ethyl}-5-methoxy-2-methylindoline In the manner described in Example 57 from 400 mg. (0.0013 mole) 1-acetyl-3-(2-bromoethyl - 2 - methyl-5-methoxyindoline and 1.12 g. (0.0057 mole) of 1-(o-chlorophenyl)piperazine there is obtained 1-acetyl-3-{2-[4-(o-chlorophenyl)-1-piperazinyl]ethyl} - 5 - methoxy-2-methylindoline as a cream colored solid, M.P. 125–127° C.

EXAMPLE 72

Preparation of 1-(p-chlorobenzoyl)-5-methoxy-2-methyl-3-[2-(4-phenyl-1-piperazinyl)ethyl]indoline A solution of 400 mg. of crude 1-(p-chlorobenzoyl)-3-(2-chloroethyl)-5-methoxy-2-methylindoline in 15 ml. of dry benzene is treated with 5 ml. of 1-phenylpiperazine and heated at reflux temperature for 16 hours. The solution is evaporated, and the residue is distributed between benzene and sodium bicarbonate solution. The organic layer is washed with saline, dried and evaporated. The residue is crystallized from ether-hexane and then recrystallized from acetone-hexane to give crystals.

EXAMPLE 73

Preparation of 1-acetyl-5-methoxy-3-{2-[4-(o-methoxyphenyl)-1-piperazinyl]ethyl}-2-methyl-6-nitroindoline To 75 ml. toluene is added 2.0 g. (0.01 mol) of 1-(o-methoxyphenyl)piperazine and 1.34 g. (3.76 mmol) of 1-acetyl-3-(2-bromoethyl)-5-methoxy-2-methyl - 6 - nitroindoline. The reaction mixture is stirred under reflux overnight and then filtered. The filtrate is concentrated and then extracted with ethyl acetate. The organic layer is washed with water, dried over magnesium sulfate, clarified with activated carbon and concentrated to yield a dark amber oil. Purification by chromatography on a synthetic magnesia-silica adsorbent affords 1-acetyl-5-methoxy-3-{2-[4-(o-methoxyphenyl)-1-piperazinyl]ethyl} - 2 - methyl-6-nitroindoline, M.P. 146–149° C.

EXAMPLE 74

Preparation of 1-benzoyl-5,6-dimethoxy-2-methyl-3-[2-(4-phenyl-1-piperazinyl)ethyl]indoline A solution of 0.70 g. (0.0017 mole) of 1-benzoyl-3-(2-bromoethyl)-5,6-dimethoxy-2-methylindoline and 1.1 g. (0.0069 mole) of N-phenylpiperazine in 20 ml. of toluene is stirred under reflux for 65 hours. The precipitate which forms is separated by filtration and the filtrate concentrated. The residue is partitioned between water and ethyl acetate and the organic layer is separated, dried over magnesium sulfate and concentrated to a yellow oil. Purification of the oil by chromatography on a synthetic magnesia-silica adsorbent affords 1-benzoyl-5,6-dimethoxy-2-methyl-3-[2-(4-phenyl-1-piperazinyl)ethyl]indoline as a yellow glass.

EXAMPLE 75

Preparation of 1-benzoyl-5,6-dimethoxy-2-methyl-3-{2-[4-(o-methoxyphenyl)-1-piperazinyl]ethyl}indoline A solution of 1.5 g. (0.0037 mole) of 1-benzoyl-3-(2-bromoethyl)-5,6-dimethoxy-2-methylindoline and 2.2 g. (0.011 mole) of 1-(o-methoxyphenyl)piperazine in 50 ml. of benzene is stirred under reflux for 70 hours. The precipitate which forms is separated by filtration and the filtrate is washed with water, dried over magnesium sulfate, and concentrated to a yellow oil. The oil is purified by chromatography on a synthetic magnesia-silica adsorbent to yield 1-benzoyl-5,6-dimethoxy-2-methyl-3-{2-[4-(o-methoxyphenyl)-1-piperazinyl]ethyl}indoline as a yellow glass. This substance gives a dihydrochloride monohydrate upon treatment with ethereal hydrogen chloride. This salt is obtained from ethanol-ether as white crystals, M.P. 199°–200° C. (decomp.)

EXAMPLE 76

Preparation of 1-benzoyl-5,6-dimethoxy-2-methyl-3-{2-[4-(m-chlorophenyl)-1-piperazinyl]ethyl}indoline A solution of 1.5 g. (0.0037 mole) of 1-benzoyl-3-(2-bromoethyl)-5,6-dimethoxy-2-methylindoline and 2.1 g. (0.011 mole) of 1-(m-chlorophenyl)piperazine in 50 ml. of benzene is stirred under reflux for 70 hours. The precipitate which forms is separated by filtration and the filtrate is washed with water, dried over magnesium sulfate, and concentrated to a yellow oil. Purification of the oil by chromatography using a synthetic magnesia-silica adsorbent affords 1-benzoyl-5,6-dimethoxy-2-methyl-3-{2-[4-(m-chlorophenyl)-1-piperazinyl]ethyl}indoline as a yellow glass.

EXAMPLE 77

Preparation of 1-acetyl-5-bromo-3-{2-[4-(o-methoxyphenyl)-1-piperazinyl]ethyl}indoline In the manner described in Example 55 treatment of 1-acetyl-5-bromo-3-(2-bromoethyl)indoline with 1-(o-methoxyphenyl)piperazine in refluxing toluene is productive of 1-acetyl-5-bromo-3-{2-[4-(o-methoxyphenyl)-1-piperazinyl]ethyl}indoline.

EXAMPLE 78

Preparation of 1-benzoyl-5,6-dimethoxy-2-methyl-3-{2-[4-(m-trifluoromethylphenyl)-1-piperazinyl]ethyl}indoline In the manner described in Example 76 treatment of 3.0 g. (0.0074 mole) of 1-benzoyl-3-(2-bromoethyl)-5,6-dimethoxy-2-methylindoline with 3.45 g. (0.015 mol) of 1-(m-trifluoromethylphenyl)piperazine gives 1-benzoyl-5,6-dimethoxy-2-methyl-3-{2-[4-(m-trifluoromethylphenyl)-1-piperazinyl]ethyl}indoline. An ethereal solution of the last substance is treated with hydrogen chloride, and the solid which results is recrystallized from acetonitrile to give the monohydrochloride as white crystals, M.P. 232–233° C. dec.

EXAMPLE 79

Preparation of 3-[2-(4-phenyl-1-piperazinyl)ethyl]indoline

A solution of 4.4 g. of 1-acetyl-3-[2-(4-phenyl-1-piperazinyl)ethyl]indoline and 80 ml. of 6 N hydrochloric acid is heated under reflux for 30 minutes. The solution is concentrated under reduced pressure to 10 ml., diluted with water and rendered alkaline with sodium hydroxide solution. The alkaline solution is extracted with ether. The ether extract is washed with saturated sodium chloride solution, dried with magnesium sulfate and evaporated under reduced pressure affording 3.4 g. of 3-[2-(4-phenyl-1-piperazinyl)ethyl]indoline. The dimaleate salt has M.P. 139–141° C.

EXAMPLE 80

Preparation of 3-{2-[4-(o-methoxyphenyl)-1-piperazinyl]ethyl}indoline

According to the manner described in Example 79, 1.20 g. of 1-acetyl-3-{2-[4-(o-methoxyphenyl)-1-piperazinyl]ethyl}indoline and 25 ml. of 6 N hydrochloric acid gives 3-{2-[4-(o-methoxyphenyl)-1-piperazinyl]ethyl}indoline trihydrochloride, M.P. 248–250° C.

EXAMPLE 81

Preparation of 6,7-dihydro-7-{2-[4-(o-methoxyphenyl)piperazinyl]ethyl} - 5H - 1,3 - dixolo[4,5-f]indole difumarate A solution of 500 mg. of 5-acetyl-6,7-dihydro-7-{2-[4-(o-methoxyphenyl)piperazinyl]ethyl} - 5H - 1,3 - dioxolo[4,5-f]indole and 10 ml. of 6 N hydrochloric acid is heated at reflux for 15 minutes. The solution is treated with activated charcoal, filtered and evaporated under reduced pressure. The residual gum is evaporated several times with ethanol. The resulting glass is dissolved in ethanol, treated with activated charcoal and the solvent removed under reduced pressure. The residual glass is dissolved in water. The aqueous solution is rendered alkaline with 10 N sodium hydroxide, and extracted with ethyl acetate. The ethyl acetate solution is evaporated under reduced pressure affording 6,7-dihydro-7-{2-[4-(o-methoxyphenyl)piperazinyl]ethyl}-5H-1,3-dioxolo[4,5-f]indole, the difumarate of which has M.P. 193–195° C.

EXAMPLE 82

Preparation of 6,7-dihydro-7-{2-[3-methyl-4-(p-tolyl)piperazinyl]ethyl}-5H-1,3-dioxolo[4,5-f]indole A solution of 530 mg. of 5-acetyl-6,7-dihydro-7-{2-[3-methyl-4-(p-tolyl)piperazinyl]ethyl} - 5H - 1,3 - dioxolo[4,5-f]indole and 10 ml. of 6 N hydrochloric acid is heated under reflux for 15 minutes. The solution is treated with activated charcoal, filtered and evaporated under reduced pressure. The residual gum is evaporated several times with ethanol. The resulting glass is dissolved in ethanol, treated with activated charcoal and the solvent removed under reduced pressure affording 6,7-dihydro-7-{2 - [3 - methyl-4-(p-tolyl)piperazinyl]ethyl}-5H-1,3-dioxolo[4,5-f]indole trihydrochloride, M.P. 219–224° C.

EXAMPLE 83

Preparation of 6,7-dihydro-7-{2-[4-(m-tolyl)piperazinyl]ethyl}-5H-1,3-dioxolo[4,5-f]indole In the manner described in Example 82, from 500 mg. of 5 - acetyl - 6,7 - dihydro-7-{2-[4-(m-tolyl)piperazinyl]ethyl}-5H-1,3-dioxolo[4,5-f]indole and 10 ml. 6 N hydrochloric acid is obtained 6,7-dihydro-7-{2-[4-(m-tolyl)piperazinyl]ethyl} - 5H-1,3-dioxolo[4,5-f]indoline trihydrochloride.

EXAMPLE 84

Preparation of 5-bromo-3-{2-[4-(o-methoxyphenyl)-1-piperazinyl]ethyl}indoline

In the manner described in Example 82 a solution of 1 - acetyl - 5 - bromo-3-{2-[4-(o-methoxyphenyl)-1-piperazinyl]ethyl}indoline in 6 N hydrochloric acid is heated at reflux temperature for 15 minutes. Removal of the solvent furnishes the hydrochloride salt of 5-bromo-3-{2-[4-(o-methoxyphenyl)-1-piperazinyl]ethyl}indoline.

EXAMPLE 85

Preparation of 6,7-dihydro-7-{2-[4-(o-tolyl)piperazinyl]ethyl}-5H-1,3-dioxolo[4,5-f]indole In the manner described in Example 82, from 500 mg. of 5 - acetyl - 6,7 - dihydro-7-{2-[4-(o-tolyl)piperazinyl]ethyl}-5H-1,3-dioxolo[4,5-f]indoline and 10 ml. of 6 N hydrochloric acid is obtained 6,7-dihydro-7-{2-[4-(o-tolyl)piperazinyl]ethyl}5-H-1,3-dioxolo[4,5-f]indole trihydrochloride.

EXAMPLE 86

Preparation of 5-methoxy-2-methyl-3-[2-(4-phenyl-1-piperazinyl)ethyl]indoline

In the manner described in Example 79, from 1.86 g. (4.7 mmol) of 1-acetyl-5-methoxy-2-methyl-3[2-(4-phenyl-1-piperazinyl)ethyl]indoline and 60 ml. of 6 N hydrochloric acid is obtained 5-methoxy - 2 - methyl-3-[2-(4- phenyl-1-piperazinyl)ethyl]indoline as white crystals, M.P. 64–67° C.

EXAMPLE 87

Preparation of 5-methoxy-3-{2-[4-(o-methoxyphenyl)-1-piperazinyl]ethyl}-2-methylindoline In the manner described in Example 79, from 2.52 g. (5.9 mmol) of 1 - acetyl - 5 - methoxy - 3-{2-[4-(o-methoxyphenyl) - 1 - piperazinyl]ethyl}-2-methylindoline and 75 ml. of 6 N hydrochloric acid is obtained 5-methoxy - 3 - {2-[4 - (o-methoxyphenyl)-1-piperazinyl]ethyl}-2-methylindoline as white crystals, M.P. 92–93° C.

EXAMPLE 88

Preparation of 3-{2-[4-(o-chlorophenyl)-1-piperazinyl]ethyl}-5-methoxy-2-methylindoline In the manner described in Example 79, from 1.25 g. (2.9 mmol) of 1 - acetyl - 3 - {2-[4-(o-chlorophenyl)-1 - piperazinyl]ethyl} - 5 - methoxy-2-methylindoline and 50 ml. of 6 N hydrochloric acid is obtained 3{2-[4-(o-chlorophenyl) - 1 - piperazinyl]ethyl} - 5 - methoxy-2-methylindole as off-white crystals, M.P. 109–110° C.

EXAMPLE 89

Preparation of 5,6-dimethoxy-2-methyl-3-[2-3(4-phenyl-1-piperazinyl)ethyl]indoline A solution of 0.32 g. (0.00066 mole) of 1-benzoyl-5,6-dimethoxy - 2 - methyl - 3 - [2-(4-phenyl-1-piperazinyl)ethyl]indoline in 10 ml. of 6 N hydrochloric acid is stirred under reflux for 30 minutes and then poured into 50 ml. of ice-cold aqueous sodium bicarbonate solution. The mixture is rendered alkaline with 10 N sodium hydroxide solution and extracted with methylene chloride. The extract is dried over magnesium sulfate and concentrated to a yellow oil. Crystallization from ether affords 5,6-dimethoxy - 2 - methyl - 3 - [2-(4-phenyl-1-piperazinyl)ethyl]indoline, M.P. 112–113° C.

EXAMPLE 90

Preparation of 5-methoxy-2-methyl-3-[2-(4-phenyl-1-piperazinyl)ethyl[indoline

In the manner described in Example 79 a solution of 5-methoxy - 2 - methyl - 3 - [2-(4-phenyl-1-piperazinyl)ethyl]-1-(p-nitrobenzoyl)indoline in 6 N hydrochloric acid is heated at reflux temperature for 15 minutes. Removal of the solvent furnishes 5 - methoxy - 2 - methyl-3 - [2 - (4 - phenyl - 1 - piperazinyl)ethyl]indoline as white crystals, M.P. 64–67° C.

EXAMPLE 91

Preparation of 5-methoxy-3-{2-[4-(o-methoxyphenyl)-1-piperazinyl]ethyl}-2-methylindoline In the manner described in Example 79 a solution of 5 - methoxy - 3 - {2 - [4 - (o-methoxyphenyl) - 1-piperazinyl]ethyl}-2-methyl-1-(p-nitrobenzoyl)indoline in 6 N hydrochloric acid is heated at reflux temperature for 15 minutes. Removal of the solvent furnishes 5-methoxy-3 - {2 - [4 - (o-methoxyphenyl) - 1 - piperazinyl[ethyl}-2-methylindoline as white crystals, M.P. 90–93° C.

EXAMPLE 92

Preparation of 3-{2-[4-(o-methoxyphenyl)-1-piperazinyl]ethyl}-5-nitroindoline dihydrochloride A mixture of 1.0 g. (0.0024 mole) of 1-acetyl-3-{2-[4-(o-methoxyphenyl) - 1 - piperazinyl]ethyl} - 5-nitroindoline and 20 ml. of 6 N hydrochloric acid is stirred under reflux for 15 minutes. Concentration affords a yellow oil which is crystallized from methanol-ethanol to yield 3 - {2 - [4 - (o-methoxyphenyl) - 1 - piperazinyl]ethyl}-5-nitroindoline dihydrochloride, M.P. 243–246° C. dec.

EXAMPLE 93

Preparation of 1-acetyl-3-{2-[4-(o-methoxyphenyl)-1-piperazinyl]ethyl}-5-aminoindoline A mixture of 1.0 g. (0.0024 mole) of 1-acetyl-3-{2-[4-(o-methoxyphenyl) - 1 - piperazinyl]ethyl} - 5 - nitroindoline, 0.20 g. of 83% platinum oxide, 20 ml. of 6 N hydrochloric acid, and 50 ml. of ethanol is shaken under hydrogen pressure for one hour. The catalyst is separated by filtration and the solvent removed by concentration. The residue is partitioned between water and methylene chloride and the aqueous layer is separated and rendered alkaline using aqueous sodium hydroxide solution, and extracted with methylene chloride. The extract is dried over anhydrous magnesium sulfate, clarified using activated carbon, and concentrated to yield 1 - acetyl - 3-{2 - [4 - (o-methoxyphenyl) - 1 - piperazinyl]ethyl}-5-aminoindoline as a yellow oil.

EXAMPLE 94

Preparation of 3-{2-[4-(o-methoxyphenyl)-1-piperazinyl]ethyl}-5-aminoindoline hydrochloride A solution of 0.90 g. (0.0023 mole) of 1-acetyl-3-{2-[4 - (o-methoxyphenyl) - 1 - piperazinyl]ethyl}-5-aminoindoline in 20 ml. of 6 N hydrochloric acid is heated on a steam bath for 30 minutes. The solution is clarified with activated carbon and concentrated. Dilution of the residue with ether followed by filtration affords 3-{2-[4-(o-methoxyphenyl) - 1 - piperazinyl]ethyl}-5-aminoindoline hydrochloride, M.P. 185–195° C. dec.

EXAMPLE 95

Preparation of 5-amino-3-{2-[4-(o-methoxyphenyl)-1-piperazinyl]ethyl}indoline hydrochloride In the manner described in Example 82 a solution of N-{1 - acetyl - 3 - [2-(4-o-methoxyphenyl-1-piperazinyl)ethyl]-5-indolinyl}acetamide in 6 N hydrochloric acid is heated at reflux temperature for 15 minutes. Removal of the solvent furnishes a gray powder, M.P. 183–190° C. dec.

EXAMPLE 96

Preparation of 1-acetyl-3-{2-[4-(o-methoxyphenyl)-1-piperazinyl]ethyl}-5-dimethylaminoindoline A mixture of 0.39 g. (0.0010 mole) of 1-acetyl-3-{2-[4 - (o-methoxyphenyl) - 1-piperazinyl]ethyl}-5-aminoindoline, 2.2 ml. formic acid, and 0.23 ml. of 37% aqueous formaldehyde is stirred under reflux for 5 hours. The solution is diluted with 1 N hydrochloric acid and extracted with ether-ethyl acetate. The aqueous layer is separated, rendered alkaline using aqueous sodium hydroxide solution, and extracted with ethyl acetate. The extract is dried over anhydrous magnesium sulfate and concentrated to yield 1 - acetyl - 3 - {2 - [4-(o-methoxyphenyl)-1-piperazinyl]ethyl}-5-dimethylaminoindoline as a yellow gum.

EXAMPLE 97

Preparation of 3-{2-[4-(o-methoxyphenyl)-1-piperazinyl]ethyl}-5-dimethylaminoindoline In the manner described in Example 82, 1-acetyl-3-{2-[4 - (o-methoxyphenyl) - 1 - piperazinyl]ethyl}-5-dimethylaminoindoline is hydrolyzed to 3 - {2-[4-(o-methoxyphenyl) - 1-piperazinyl]ethyl}-5-dimethylaminoindoline.

EXAMPLE 98

Preparation of 5,6-dimethoxy-3-{2-[4-o-methoxyphenyl)-1-piperazinyl]ethyl}indoline In the manner described in Example 82 a solution of 2.57 g. (5.85 mol) of 1 - acetyl - 5,6-dimethoxy-3-{2-[4 - (o-methoxyphenyl) - 1 - piperazinyl]ethyl}indoline in 50 ml. of 6 N hydrochloric acid is heated at reflux temperature for 15 minutes. Removal of the solvent furnishes the hydrochloride salt of 5,6-dimethoxy-3-{2-[4-(o-methoxyphenyl)-1-piperazinyl]ethyl}indoline as a glass.

EXAMPLE 99

Preparation of 5,6-dimethoxy-2-methyl-3-{2-[4-(m-trifluoromethylphenyl)-1-piperazinyl]ethyl}indoline In the manner described in Example 82 a solution of 1-benzoyl - 5,6 - dimethoxy - 2 - methyl-3-{2-[4-(m-trifluoromethylphenyl)-1-piperazinyl]ethyl}indoline in 6 N hydrochloric acid is heated at reflux temperature for 15 minutes. Removal of the solvent furnishes a hydrochloride salt of 5,6-dimethoxy-2-methyl-3{2-[4-(m-trifluoromethylphenyl)-1-piperazinyl]ethyl}indoline.

EXAMPLE 100

Preparation of 5-chloro-3-{2-[4-(m-tolyl)-3-methyl-1-piperazinyl]ethyl}indoline

In the manner described in Example 82 a solution of 1-acetyl - 5 - chloro - 3 - {2-[4-(m-tolyl)-3-methyl-1-piperazinyl]ethyl}indoline in 6 N hydrochloric acid is heated at reflux temperature for 15 minutes. Removal of the solvent furnishes the hydrochloride salt of the product.

EXAMPLE 101

Preparation of 5,6-dimethoxy-3-{2-[4-(p-methoxyphenyl)-3-methyl-1-piperazinyl]ethyl}indoline In the manner described in Example 82 a solution of 1 - acetyl - 5,6 - dimethoxy-3-{2-[4-(p-methoxyphenyl)-3-methyl-1-piperazinyl]ethyl}indoline in 6 N hydrochloric acid is heated at reflux temperature for 15 minutes. Removal of the solvent furnishes the hydrochloride salt of 5,6 - dimethoxy - 3-{2-[4-(p-methoxyphenyl)-3-methyl-1-piperazinyl]ethyl}indoline.

EXAMPLE 102

Preparation of 5,6-dimethoxy-3-[2-(4-phenyl-1-piperazinyl)ethyl]indoline

In the manner described in Example 82 a solution of 1-acetyl - 5,6 - dimethoxy - 3-[2-(4-phenyl-1-piperazinyl)ethyl]indoline in 6 N hydrochloric acid is heated at reflux temperature for 15 minutes. Removal of the solvent furnishes 5,6 - dimethoxy - 3-[2-(4-phenyl-1-piperazinyl)ethyl]indoline trihydrochloride.

EXAMPLE 103

Preparation of 5-methoxy-2-methyl-3-[2,(4-phenyl-1-piperazinyl)ethyl]indoline

In the manner described in Example 79 a solution of 1-(p - chlorobenzoyl) - 5 - methoxy - 2-methyl-3-[2-(4-phenyl-1-piperazinyl)ethyl]indoline in 6 N hydrochloric acid is heated at reflux temperature for 15 minutes. The product is obtained as white crystals, M.P. 64–67° C.

We claim:
1. A compound selected from the group consisting of those of the formula:

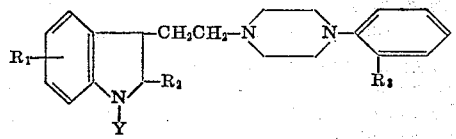

wherein $R_1$ is 5,6-dimethoxy or 5,6-methylenedioxy, $R_2$ is hydrogen or methyl, $R_3$ is hydrogen or methoxy, and Y is benzoyl, para-chlorobenzoyl, para-nitrobenzoyl or lower alkanoyl, with the proviso that when $R_1$ is 5,6-dimethoxy and $R_3$ is methoxy then $R_2$ must be methyl; and the pharmacologically acceptable acid-addition salts thereof.

2. The compound according to claim 1 wherein $R_1$ is 5,6-dimethoxy, $R_2$ is hydrogen, $R_3$ is hydrogen, and Y is propionyl; 1 - propionyl-5,6-dimethoxy-3-[2-(4-phenyl-1-piperazinyl)ethyl]indoline.

3. The compound according to claim 1 wherein $R_1$ is 5,6-dimethoxy, $R_2$ is methyl, $R_3$ is hydrogen, and Y is acetyl; 1 - acetyl-5,6-dimethoxy-2-methyl-3-[2-(4-phenyl-1-piperazinyl)ethyl]indoline.

4. The compound according to claim 1 wherein $R_1$ is 5,6-dimethoxy, $R_2$ is methyl, $R_3$ is hydrogen, and Y is benzoyl; 1 - benzoyl - 5,6-dimethoxy-methyl-3-[2-(4-phenyl-1-piperazinyl)ethyl] indoline.

5. The compound according to claim 1 wherein $R_1$ is 5,6-dimethoxy, $R_2$ is methyl, $R_3$ is methoxy, and Y is para-chlorobenzoyl; 1 - (p - chlorobenzoyl)-5,6-dimethoxy-2-methyl - 3-{2-[4-(o-methoxyphenyl)-1-piperazinyl]ethyl} indoline.

6. The compound accordinng to claim 1 wherein $R_1$ is 5,6-methylenedioxy, $R_2$ is hydrogen, $R_3$ is hydrogen, and Y is para-nitrobenzoyl; 1-(p-nitrobenzoyl)-5,6-methylenedioxy-3-[2-(4-phenyl-1-piperazinyl)ethyl]indoline.

7. The compound according to claim 1 wherein $R_1$ is 5,6-methylenedioxy, $R_2$ is hydrogen, $R_3$ is methoxy, and Y is acetyl; 1-acetyl-5,6-methylenedioxy-3-{2-[4-(o-methoxyphenyl)-1-piperazinyl]ethyl}indoline.

8. The compound according to claim 1 wherein $R_1$ is 5,6-methylenedioxy, $R_2$ is hydrogen, $R_3$ is methoxy, and Y is benzoyl; 1-benzoyl-5,6-methylenedioxy-3-{2-[4-(o-methoxyphenyl)-1-piperazinyl]ethyl}indoline.

9. The compound according to claim 1 wherein $R_1$ is 5,6-methylenedioxy, $R_2$ is methyl, $R_3$ is hydrogen, and Y is n-butyryl; 1-(n-butyryl)-5,6-methylenedioxy-2-methyl-3-[2-(4-phenyl-1-piperazinyl)ethyl]indoline.

10. The compound according to claim 1 wherein $R_1$ is 5,6-methylenedioxy, $R_2$ is methyl, $R_3$ is methoxy, and Y is isobutyryl; 1 - isobutyryl-5,6-methylenedioxy-2-methyl-3-{2-[4-(o-methoxyphenyl)-1-piperazinyl]ethyl}indoline.

References Cited
UNITED STATES PATENTS

| | | | |
|---|---|---|---|
| 3,381,006 | 4/1968 | Palazzo | 260—268 B C |
| 3,083,207 | 3/1963 | Hoehn et al. | 260—326.11 |
| 3,188,313 | 6/1965 | Archer | 260—268 B C |
| 3,198,807 | 8/1965 | Thominet | 260—319 |
| 3,362,956 | 1/1968 | Archer | 260—268 B C |
| 3,501,465 | 3/1970 | Shen et al. | 260—268 B C |

OTHER REFERENCES

Burger, Medicinal Chemistry, 2d ed., Interscience, 1960, p. 43.

DONALD G. DAUS, Primary Examiner

U.S. Cl. X.R.

260—268 B C, 268 P H, 326.3, 326.3 B, 326.5 R, 326.11, 340.5, 999

UNITED STATES PATENT OFFICE
CERTIFICATE OF CORRECTION

Patent No. 3,751,417　　　　Dated August 7, 1973

Inventor(s) George Rodger Allen, Jr., Francis Joseph McEvoy, Vern Gordon DeVries, Daniel Bryan Moran, Ruddy Littell It is certified that error appears in the above-identified patent and that said Letters Patent are hereby corrected as shown below:

Column 7, line 52　"(XVI)" should be -- (XXVI) --.
Column 7, line 53　"(XXI)" should be -- (XXXI) --.

Column 8, Table II, lines 68-69 "1-acetyl-5-methoxy-2-methyl-
　　　　-3-[2-(4-phenyl-1-ethyl} indoline"

should be

1-Acetyl-3-{ 2-[4-(o-methoxyphenyl)-1-pipera-
zinyl]ethyl} indoline

Signed and sealed this 16th day of April 1974.

(SEAL)
Attest:

EDWARD M. FLETCHER, JR.　　　　C. MARSHALL DANN
Attesting Officer　　　　　　　　Commissioner of Patents